(12) United States Patent
Vega et al.

(10) Patent No.: US 8,972,567 B2
(45) Date of Patent: Mar. 3, 2015

(54) SELECTIVELY TRIGGERING EXECUTION OF SERVICES IN A COMPUTING ENVIRONMENT

(75) Inventors: Jeffrey J. Vega, Suwannee, GA (US); Robert E. Houser, Jr., Cumming, GA (US); Matthew S. Magee, Johns Creek, GA (US)

(73) Assignee: SAGE Software, Inc., Irvine, CA (US)

( * ) Notice: Subject to any disclaimer, the term of this patent is extended or adjusted under 35 U.S.C. 154(b) by 119 days.

(21) Appl. No.: 13/368,565

(22) Filed: Feb. 8, 2012

(65) Prior Publication Data

US 2013/0205008 A1  Aug. 8, 2013

(51) Int. Cl.
*G06F 15/173* (2006.01)

(52) U.S. Cl.
USPC .......................................... 709/224

(58) Field of Classification Search
USPC ........................... 709/224; 706/45
See application file for complete search history.

(56) References Cited

U.S. PATENT DOCUMENTS

| | | | |
|---|---|---|---|
| 6,473,745 B2 | 10/2002 | Doerr et al. | |
| 6,795,856 B1 * | 9/2004 | Bunch ............................ | 709/224 |
| 6,871,195 B2 | 3/2005 | Ryan et al. | |
| 6,973,620 B2 | 12/2005 | Gusler et al. | |
| 7,035,926 B1 | 4/2006 | Cohen et al. | |
| 7,260,498 B2 | 8/2007 | Battenfelder et al. | |
| 7,543,232 B2 | 6/2009 | Easton, Jr. et al. | |
| 7,594,176 B1 | 9/2009 | English | |
| 7,614,014 B2 | 11/2009 | Burgin et al. | |
| 7,636,887 B1 | 12/2009 | Kinnucan, Jr. | |
| 7,861,178 B2 | 12/2010 | Lui et al. | |
| 7,865,454 B2 * | 1/2011 | Grechanik ...................... | 706/45 |
| 7,865,829 B1 | 1/2011 | Goldfield et al. | |
| 7,873,606 B2 | 1/2011 | Dias et al. | |
| 8,468,110 B1 * | 6/2013 | Podgorny et al. .............. | 706/45 |
| 2003/0028513 A1 | 2/2003 | Pawar | |
| 2003/0043180 A1 | 3/2003 | Gusler et al. | |
| 2004/0193907 A1 | 9/2004 | Patanella | |

(Continued)

FOREIGN PATENT DOCUMENTS

| WO | WO 00/74193 A1 | 12/2000 |
|---|---|---|
| WO | WO 03/041048 A2 | 5/2003 |

OTHER PUBLICATIONS

Garcia, Federico, "CACTUS: Automated Tutorial Course Generation for Software Applications", Universidad Autonoma de Madrid (UAM), 8 pages (2000).

(Continued)

*Primary Examiner* — Vivek Srivastava
*Assistant Examiner* — Karina J Garcia-Ching
(74) *Attorney, Agent, or Firm* — Matthew M. Hulihan, Esq.; Heslin Rothenberg Farley & Mesiti P.C.

(57) ABSTRACT

Rule-based triggering of execution of services is provided. An advisor program identifies an application attribute(s) about which data is to be obtained, based on the presence of the application attribute(s) in one or more logical expressions of one or more rules. The one or more rules are developed and managed separate from the program code of the application and use at least one identifier employed by the application in identifying application attributes. Data about the application attribute(s), for instance user behavior with respect to the application attribute(s), is obtained, and the logical expression(s) of the rule(s) are evaluated based on the obtained data to determine whether to trigger execution of one or more services specified in the rule(s).

20 Claims, 7 Drawing Sheets

(56) References Cited

U.S. PATENT DOCUMENTS

| | | |
|---|---|---|
| 2005/0026129 A1 | 2/2005 | Rogers |
| 2006/0026531 A1 | 2/2006 | Lin et al. |
| 2006/0265232 A1 | 11/2006 | Katariya et al. |
| 2007/0213984 A1 | 9/2007 | Ativanichayaphong et al. |
| 2009/0089751 A1 | 4/2009 | Raikes et al. |
| 2011/0066470 A1 | 3/2011 | Goyal et al. |

OTHER PUBLICATIONS

Brusilovsky et al., "Domain, Task, and User Models for an Adaptive Hypermedia Performance Support System", IUI'02, San Francisco, CA, 8 pages (Jan. 13-16, 2002).

International Search Report and Written Opinion of the International Searching Authority in corresponding Application No. PCT/US2013/025112, dated Sep. 2, 2013, 9 pages.

* cited by examiner

```
- <Rule>  ⌐602
    <Description>This is a Rule Description</Description> ~604
    <Version>2</Version> ~606
    <Enabled>true</Enabled> ~608
  ⎡- <Criteria xsl:type = "AndExpression">
610⎨    <Description>This is a Criteria Description</Description>
  ⎪  + <Left xsl:type = "InExpression">
  ⎣  + <Right xsl:type = "AndExpression">
    </Criteria>
  ⎡- <Actions>
  ⎪   - <ActionDataContainer>
  ⎪        •
  ⎪        •
612⎨        •
  ⎪     </ActionDataContainer>
  ⎪   + <ActionDataContainer>
  ⎪   + <ActionDataContainer xsl:type = "SignalActionDataContainer" signalType = "ActionPassed">
  ⎣   + <ActionDataContainer xsl:type = "SignalActionDataContainer" signalType = "ActionFailed">
    </Actions>
  </Rule>
```

FIG. 6

SELECTIVELY TRIGGERING EXECUTION OF SERVICES IN A COMPUTING ENVIRONMENT

BACKGROUND

In computing, Electronic Performance Support Systems (EPSS) attempt to provide assistance to users of a computer system based on the way the user performs tasks in a software application. For instance, a user may drag an image off of a printable area of a viewable page, and, in response, the EPSS may cause a message to appear alerting the user that the picture will not be printed when printing the viewable page unless the image appears within the margin of the page. In more sophisticated implementations of an EPSS, the message may offer to move the picture back into the printable area of the page.

Traditional performance support systems have been indistinguishable from the applications in which they provide assistance. That is, the program code that causes provision of user assistance (i.e., a help message or a prompt to do something in the application) was incorporated into the program code of the application, and for use with only that particular application. In other words, the support system was compiled and/or coded into the application to which it applied.

What is needed is a more robust and dynamic support system applicable across a range of software application products without a requirement that the support system be hard-coded into each of the software application products.

BRIEF SUMMARY

The shortcomings of the prior art are overcome and additional advantages are provided through the provision of a method for selectively triggering execution of services in a computing environment. The method includes, for instance, providing an advisor program, the advisor program to execute on a processor and to perform a method comprising: responsive to an event associated with an application of the computing environment, identifying at least one application attribute associated with the application, the at least one application attribute being specified as at least one element of a logical expression of a rule, the rule being defined separate from the application using at least one identifier, the at least one identifier employed, at least in part, by the application in identifying application attributes thereof and the at least one identifier for specifying the at least one application attribute in the logical expression, responsive to identifying the at least one application attribute, obtaining data about the at least one application attribute, evaluating the logical expression based on the obtained data to determine whether the logical expression is true, and responsive to determining that the logical expression is true, triggering execution of one or more services specified in the rule.

Additionally, a computer system for selectively triggering execution of services in a computing environment is provided. The computer system includes a memory and a processor in communication with the memory, wherein the computer system is configured to perform a method comprising: providing an advisor program, the advisor program performing a method comprising: responsive to an event associated with an application of the computing environment, identifying at least one application attribute associated with the application, the at least one application attribute being specified as at least one element of a logical expression of a rule, the rule being defined separate from the application using at least one identifier, the at least one identifier employed, at least in part, by the application in identifying application attributes thereof and the at least one identifier for specifying the at least one application attribute in the logical expression, responsive to identifying the at least one application attribute, obtaining data about the at least one application attribute, evaluating the logical expression based on the obtained data to determine whether the logical expression is true, and responsive to determining that the logical expression is true, triggering execution of one or more services specified in the rule.

Further, a computer program product for triggering of execution of services in a computing environment is provided. The computer program product includes at least one tangible storage medium readable by a processor and storing instructions for execution by the processor to perform a method comprising: providing an advisor program, the advisor program performing a method comprising: responsive to an event associated with an application of the computing environment, identifying at least one application attribute associated with the application, the at least one application attribute being specified as at least one element of a logical expression of a rule, the rule being defined separate from the application using at least one identifier, the at least one identifier employed, at least in part, by the application in identifying application attributes thereof and the at least one identifier for specifying the at least one application attribute in the logical expression, responsive to identifying the at least one application attribute, obtaining data about the at least one application attribute, evaluating the logical expression based on the obtained data to determine whether the logical expression is true, and responsive to determining that the logical expression is true, triggering execution of one or more services specified in the rule.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts an example of an XML-based rule format using descriptive data elements, in accordance with one or more aspects of the present invention.

DETAILED DESCRIPTION

Figure 1:
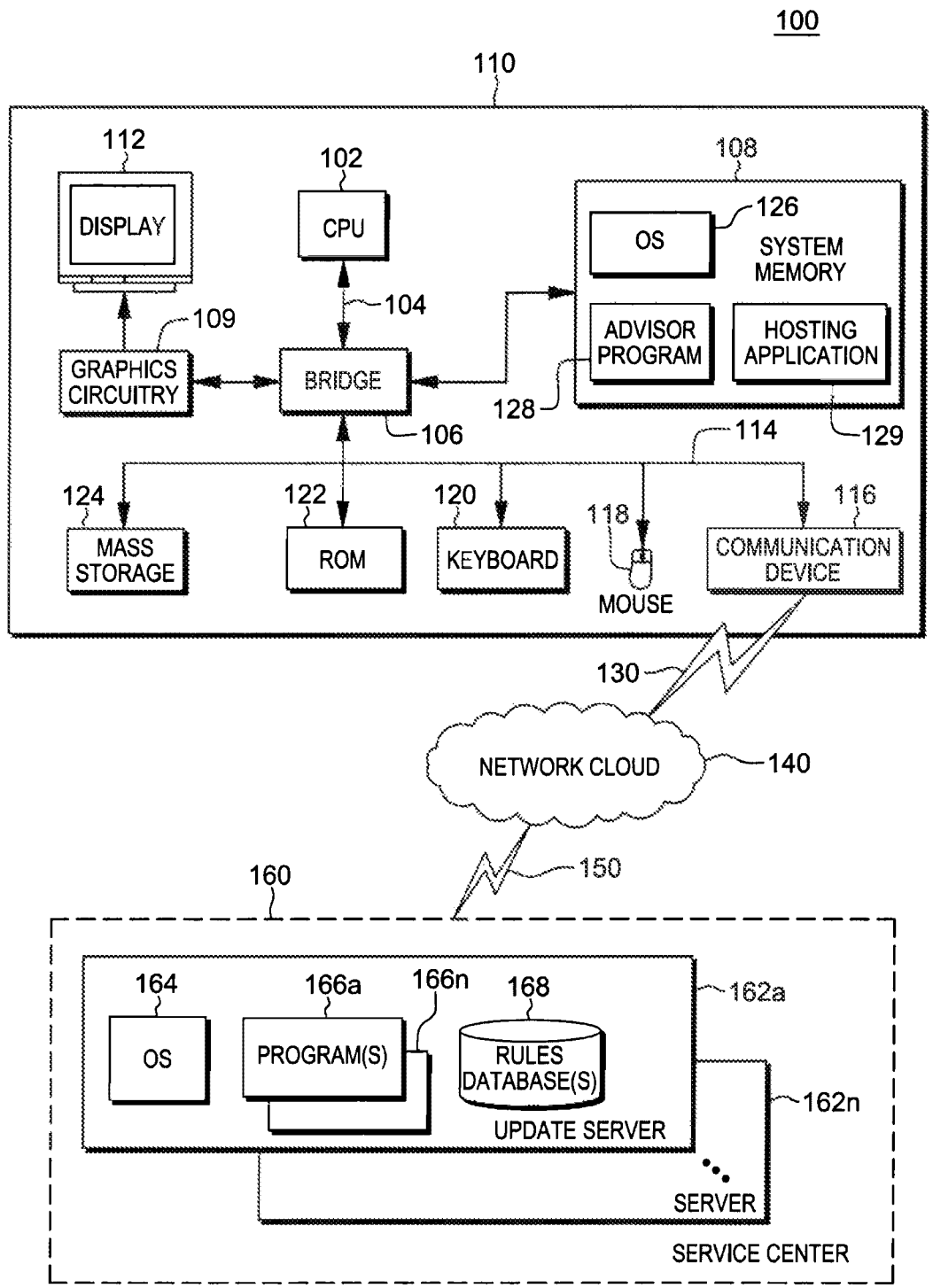
FIG. 1 depicts a block diagram of a computing environment to incorporate and use one or more aspects of the present invention.

An advisor program and related features are described herein. The advisor program is provided for selectively triggering execution of services in a computing environment. The advisor program can determine, responsive to an event associated with an application of the computing environment, attribute(s) associated with the application about which data, for instance data about user behavior with respect to the application attribute(s), is to be obtained. The application attribute(s) are specified elements of a logical expression of a rule, which is defined separate from the application. The rule definition use identifiers which are, in part, employed by the application in identifying the attributes of the application. After determining the application attribute(s) and obtained data about them, the advisor program evaluates the logical expression based on the obtained data to determine whether the logical expression is true, and, if so, execution of one or more services specified in the rule is triggered.

In one particular example, the advisor program monitors user behavior with respect to the application attribute(s) and builds a user behavior state based at least partially on the monitored user behavior. The logical expression of the rule is then evaluated based on the built user behavior state to determine whether the logical expression is true, and execution of one or more services specified in the rule is triggered if the logical expression is evaluated to be true. Services triggered in connection with this particular example can provide coaching to users of the application based on the way the users use and interact with the application.

More specifically, the advisor program 'listens' to system activity from an application (an application "hosting" the advisor program) in the computing environment to determine whether and when to trigger one or more rules. A rule contains a specification of any combination of user behavior/actions, system variables of a computer system on which the application is installed, or application properties, such as application configuration information or user data stored by the application. This specification is in the form of triggering criteria for causing the triggering of services, such as an advice message to be displayed to the user. In one example, advice messages are displayed in a configurable, bubble-like message box near a place or portion of the application user interface where the user is working, to ensure that the user associates the advice message with the activity that the user was engaging in at the time of, or just prior to, providing the advice message to the user.

A rule engine (also referred to herein as an advisor processing engine) is a component of the advisor program. The rule engine accepts rule data, that is, the defined rules that describe the triggering criteria and indicate the services to be triggered in the computing environment if that criteria is satisfied, and, in one example, obtains data about observed user behavior and/or other system variables, application configuration information, or application user data. Triggering of the services indicated in a rule can be based solely or partially on usage and control of the application by the user. The rule engine is generic in the sense that, in one example, it is not tied to any particular software application, but instead can be shipped alongside and provide heuristics-based user advice to any computer application into which the rule engine hooks, as described below. The advisor program is therefore a reusable, generic component that can be used across or instantiated by multiple different software products. Because it listens to activity at the system level, rather than being hard-coded into a particular software application, any existing application can utilize the advisor program disclosed herein.

The advisor program advantageously enables invocation of desired services. These include any service desired to run on a computer system responsive to occurrence of a specific set of triggering criteria. Example services include provision of targeted messages to users, based on, for instance, use and/or configuration of the hosting application, and triggered via one or more rules of a dynamic set of rules that can be pushed-out to a user's workstation on-demand. Rules can be data archives that, in one example, do not have compiled aspects to their deployment. Alternatively, the rules can have compiled aspects to their deployment, which compiled aspects are separate form compiled program code of the software application. The rules can be files specified using descriptive data elements separate from the hosting application, rather than, for instance, program code incorporated into the hosting application. The rules can, in one example, be developed and pushed to the advisor program over a communications link without requiring additional installation by the users. This facilitates continuous and on-demand addition and modification of deployed rules, which enables the application developer to rapidly address unforeseen customer support issues.

The advisor program can trigger services responsive to occurrence of any desired set of triggering criteria. In one particular embodiment, the services are triggered to provide coaching to users of an application in order to assist the users in learning about and utilizing features and services of the application, based on how the user presently uses the product. Additionally, it can help new users become acquainted with the application by providing them with guidance on how to begin using the product and core features thereof. Further, it can assist users in establishing a customer support session, and facilitate collection and feedback of detailed data about how users interact with the application and respond to services triggered by other rules, to enable the application developer make future improvements to the computer product. Additional features and advantages of the advisor program are enabled as will be apparent from the detailed description to follow.

FIG. 1 depicts a block diagram of one example of a computing environment to incorporate and use one or more aspects of the present invention. A set of components referred to herein as a computing environment 100 comprises a client workstation 110 which is a user (e.g. customer) computer system. Workstation 110 includes a processor (in this example a central processing unit (CPU)) 102 for performing computations. CPU 102 is coupled to a bus bridge 106 by way of a CPU bus 104. Bus bridge 106 includes a memory controller (not shown) integrated therein, though the memory controller may be external to bus bridge 106. The memory controller provides an interface for access by CPU 102 or other devices to system memory 108. System memory 108 can include any of a variety of types of memory device or memory circuitry for storing data. Bus bridge 106 is coupled to graphics circuitry 109 for controlling display device 112. Graphics circuitry 109 includes, in one example, a video controller, video memory for storing display data to be displayed on display device 112, and a video BIOS that includes code and video services for controlling the video controller, as is well known in the art. In another embodiment, graphics circuitry 109 is coupled to CPU 102 through an Advanced Graphics Port (AGP) bus.

Display device 112 includes a display screen that may be a CRT or LCD monitor, a television which is connected to a set top box, a laptop display, or the like. Navigation through a graphical user interface provided by an operating system may be provided through the use of control buttons on a remote control unit, or by other means known in the art.

Bus bridge 106 is also coupled to a system bus 114 that may be a peripheral component interconnect (PCI) bus, Industry Standard Architecture (ISA) bus, etc., and combinations thereof, as examples. Coupled to system bus 114 are communication device 116, mouse 118, keyboard 120, non-volatile memory 122, and mass storage 124. One or more other input/output (I/O) devices (not shown) may also be coupled to system bus 114.

Mass storage device 124 can be any of numerous different types of such devices including a hard disk, floppy disk, CD-ROM, DVD-ROM, tape, high density floppy, high capacity removable media, low capacity removable media, solid state memory device, etc., and combinations thereof. Non-volatile memory 122 may be a read-only memory (ROM), flash memory, etc., and can include a system BIOS for controlling, among other things, hardware devices in workstation 110.

Communication device 116 includes a network card, a modem interface, etc. for accessing a network cloud 140 via a communications link 130. Communications link 130 links workstation 110 to a network cloud 140, and further to a communications link 150 linking a service center 160 to network cloud 140. In one embodiment, network cloud 140 includes the Internet, and computing environment 100 includes many other user computer systems as well as many other service centers (not pictured). Alternatively or additionally, network cloud 140 may include a local area network (LAN), wide area network (WAN), Intranet, etc., and/or combinations thereof.

As is familiar to those having ordinary skill in the art, workstation 110 further includes an operating system 126, which is loaded into system memory 108 from mass storage device 124, for instance, and launched after a power-on self-test (POST). Operating system 126 includes a set of one or more programs that control computer system 110's operation and the allocation of resources thereof, among other things. Example operating systems include, but are not limited or restricted to, DOS, Unix, Linux, the Windows® line of operating systems offered by Microsoft Corporation, Redmond, Wash., and the "OS" line of operating systems (such as OS X®) offered by Apple Inc., Cupertino, Calif., etc. Also loaded into memory 108 of the computer system 110 is an advisor program 128 hosted by a hosting application 129. Advisor program 128 comprises, in one embodiment, program code. Advisor program 128, in accordance with one or more aspects of the present invention, utilizes one or more rules (for instance rules stored in system memory 108 and/or mass storage 124, or stored remotely, such as with an application developer, and accessible to the workstation) for rule-based triggering of execution of one or more services, as is explained in further detail below with reference to FIGS. 2-6.

Service center 160 includes one or more update servers 162a-162n that are coupled to each other via a LAN or other arrangement. Update servers 162a-162n each include a processor, memory, communication circuitry, and software running thereon. Specifically, update server 162a includes an operating system 164, one or more programs 166a-166n, and one or more rules database(s) 168.

Application program 166a is, in one example, responsible for execution to communicate with workstation 110, and more specifically, to assist workstation 110 in providing rule-based triggering of execution of services. In one example, application program 166a executes on update server 162a and provides rule(s) and/or rule updates from rules database 168 to workstation 110. Workstation 110, and more specifically advisor program 128 thereof, uses the rules provided by update server 162a to facilitate rule-based service triggering, in accordance with aspects of the present invention. Service center 160 and/or one or more update servers 162 thereof are operated in one example by a developer of one or more software products (not pictured) executing on workstation 110. The developer may install/maintain/update the one or more software products that host advisor program 128 and/or install/maintain/update aspects of advisor program 128 on workstation 110, such as rules utilized by advisor program 128 in providing rule-based triggering of execution of one or more services.

Although advisor program 128 is depicted on workstation 110, those having ordinary skill in the art will recognize that the advisor program and/or facilities thereof as described herein could instead reside on a remote system, such as on a server of service center 160, in one example, and provide advisor program facilities described herein across a web-based interface, such as communications links 130 and 150. Similarly, aspects of update server 162a, such as rules database 168 thereof, need not reside on a remote system such as the update server 162, but could instead be implemented on workstation 110, for instance in mass storage 124 thereof. Computer environment 100 is therefore just one example of a computing environment to incorporate and use one or more aspects of the present invention.

Figure 2:
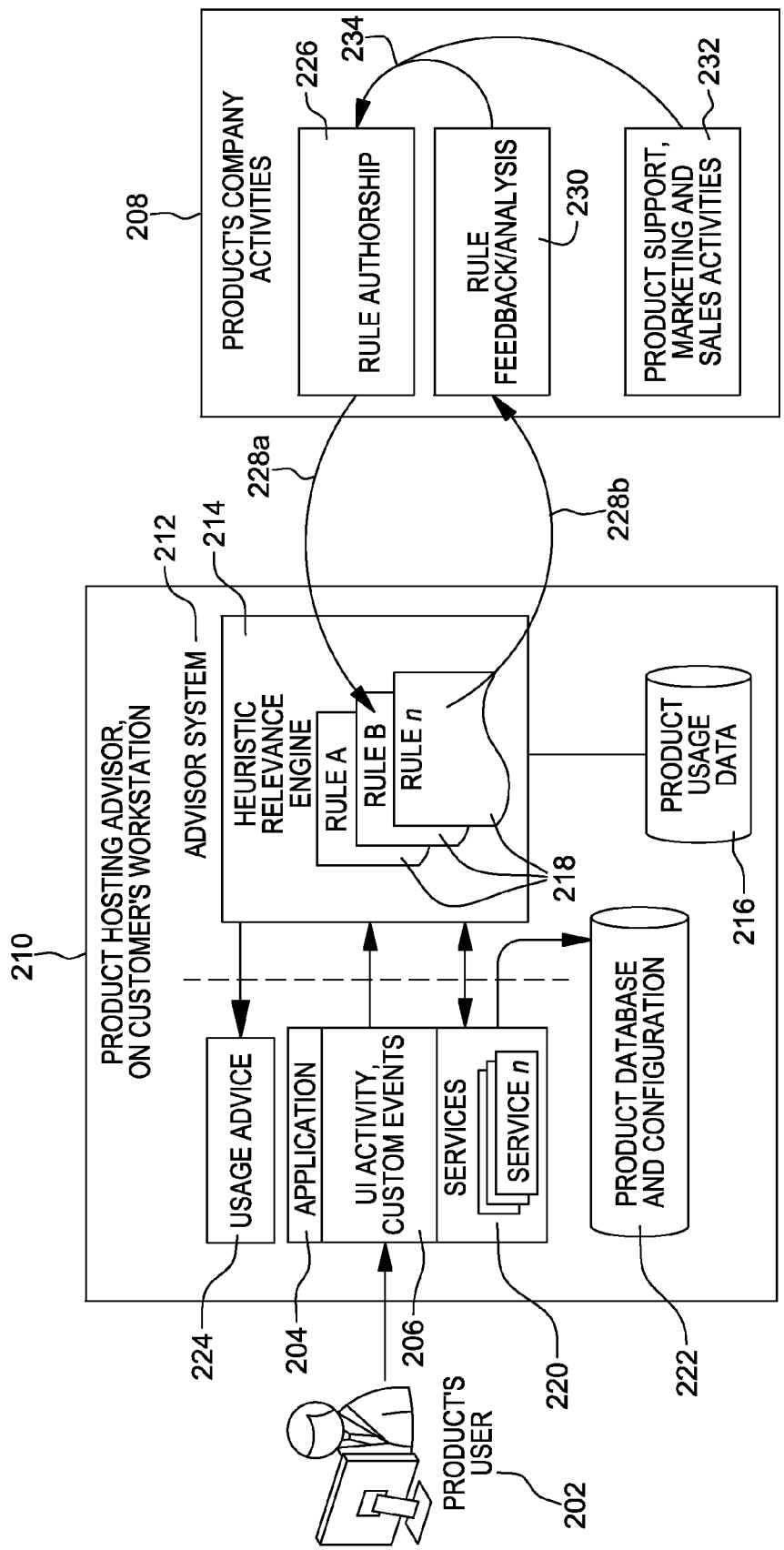
FIG. 2 depicts further details of a customer workstation and hosting product company activities in association with an advisor program, in accordance with one or more aspect of the present invention.

FIG. 2 depicts further details of a customer workstation and hosting product company activities in association with an advisor program and in accordance with one or more aspects of the present invention. In FIG. 2, a user 202 interacts with a product (computer application) 204 of workstation 210, which application is 'hosting' an advisor program. The advisor program is depicted within workstation 210 in FIG. 2, but those having ordinary skill in the art will recognize that the advisor program could instead reside remotely from the workstation, such as on a remote server maintained by the application developer or a third party. 'Hosting' in this context refers to the fact that advisor program code has been loaded by a hosting application (e.g. 129 of FIG. 1) and is executing within the executable(s) of the hosting application. The advisor program is, in this example, not a stand-alone application that monitors the hosting application, but instead runs as part of the hosting application. The hosting application (for instance an ".exe" file) executes and loads one or more advisor program files, such as a set of libraries (All files in one example), and the advisor program files can be loaded by multiple applications. Alternatively, there can be a separate copy of advisor program files for each application which is to host the advisor program, in which case each hosting program would have its own running 'instance' of the advisor program. In another example, advisor program comprises executable code and executes alongside the hosting application, either on the workstation 210 or remotely, but remains separate from the compiled code of the application. In yet a further example, advisor program is actually part of the compiled aspects of the application, rather than being a separate executing application, or being instantiated by the hosting application.

Data can be obtained about various attributes of hosting application 204. For instance, user interaction and other behavior with respect to the attributes of hosting application 204 causes data and information about various user interface (UI) activity and other events 206 to be provided to advisor system 212 (e.g. advisor program 128 of FIG. 1), and more specifically to a heuristic relevance engine 214 (also referred to herein as a rule engine or processing engine) of advisor system 212. Heuristic relevance engine 214 monitors UI activity and custom events 206 of application 204, and can store this information as product usage data 216 in a database or other storage. Additionally, heuristic relevance engine 214 evaluates a set of rules 218, for instance rules deployed to the workstation by the hosting product's company/developer, based on the received UI and event activity 206, as well as other application properties such as configuration information and user data, to determine whether rule criteria of one or more rules of the set of rules 218 is met or true. As noted above, each rule includes one or more criteria which, when satisfied, cause the rule to be triggered and, more specifically, causes one or more services indicated by one or more service requests to be invoked (for instance, executed), should the one or more criteria be satisfied. Thus, when a rule is triggered, an arbitrary number of services can be executed in the computing environment. The services specified by the rule can include services 220 associated with application 204 which are to be executed. In one example, services 220 associated with the application include one or more services for changing or updating a product database and configuration component 222, which is used for specifying configuration information/settings about the hosting application, and for containing application user data (such as databases containing data entered or imported by the user, including customer lists, invoices, inventory databases, etc, or accounting transaction information in the case where hosting application is an accounting product, or any other kind of user-originated data). In another example, a service 220 specified in a rule can indicate that usage advice 224 is to be provided to user 202. Usage advice 224 can be displayed for a specific desired reason, such as to advertise a related application feature, market new products, respond to error conditions, and/or guide the user through complex tasks within the application. While some services may be indicated as targets for execution should rule criteria be satisfied, other service(s) of the rule can be used as part of the evaluation of the rule to determine whether to trigger the target services. Rule criteria for triggering the target service(s) specified in the rule can encompass results of running one or more services that are specified in the rule, or one or more remote services that are referenced in the rule criteria. This enables, for instance, product database and configuration information 222 to be obtained via execution of one or more services specified in the rule itself (or services specified outside of the rule, but referenced by in the rule criteria rule), and can facilitate not only determination of whether to trigger a rule, but also determination of whether a rule is relevant and deserving of additional attention, for instance further monitoring of application attributes specified in the rule, as an example.

Usage advice 224 can be used to display a message to the user that is in alignment with the impetus for the rule's creation, for instance to guide a user through a process which has been found to be difficult for other users to perform. Other services to be executed could support rule feedback, enable other rules, perform some analysis of the product database and/or configuration 222, or execute call(s) to web-based service(s), as examples. These are just examples of services that may be triggered by a rule. Those having ordinary skill in the art will recognize that any desirable function or operation capable of being performed by a computer system in the computing environment could be triggered responsive to triggering of a rule.

In one embodiment, it is the application developer of the hosting product (i.e. the hosting product's company 208) that determines the set of rules 218 deployed to and/or employed by client workstation 210. Rule authorship 226 occurs as part of the product company's activities 208. Rules and message-related content thereof (such as usage advice messages 224 displayed to user 202), can be updated on-demand via communications link 228a. In one example, an automatic or user-initiated update causes workstation 210 to download data that includes new and/or updated rules, while, in another example, the product company deploys the rules to workstation 210 without involvement by user 202. Additionally or alternatively, an automatic or user-initiated process can enable rules already stored on workstation 210.

Further, feedback is provided from workstation 210 across communications link 228b to rule feedback and analysis component 230 of the hosting product's company. Rule feedback and analysis component 230 includes in one example database(s) for storing received feedback from workstation 210. This feedback may be provided by way of one or more of the services which are indicated in a rule and that are to be executed when the rule is triggered. Alternatively, the feedback may be provided by way of one or more services specified in another rule designed to monitor a user's behavior after providing the user with advice. An example service invoked upon triggering a rule might report (as part of this feedback) both the triggering of the rule as well as the effectiveness of the rule by examining changes to user behavior in response to, for instance, advice given to the user, and reporting that to product company 208. Alternatively, the service might enable another rule on the workstation that monitors the change in user behavior and provides feedback as to the effectiveness of the provided user advice. Reporting of triggering and the effectiveness of the rules, as well as product support, marketing, and sales activities 232, can drive changes 234 to the rules, wherein existing rules are modified or deleted, and/or additional rules are specified, pushed-to, downloaded, and/or enabled by workstation 210. The impetus for a rule, therefore, can originate based on a variety of needs of either the user, the developer, or both, for instance to advertise a related product feature, market new products, gather user data, or for self-service support, as examples.

As depicted in FIG. 2, advisor system 212, including heuristic relevance engine 214 is designed to be independent of the product(s) 204 hosting the advisor system 212. Unlike previous approaches in which support is provided to different programs via a support system integrated into each of those programs, advisor system 212 is not, for instance, part of the compiled code of any hosting application. Instead, advisor system 212 is reusable in the sense that it can be hosted by a variety of other products/applications, and can be expanded by way of changes, additions and deletions to the set of rules 218. Rules 218 can be updated on-demand based on feedback from the client machine and analysis of that feedback, as discussed above. In one particular embodiment, the advisor program comprises one or more files shipped along with a product which is to host the advisor program. The files, in one example data link library (.dll) files, run within the context of the program, meaning that the .dll files run as part of the hosting application and not, for instance, as a separate process having its own memory, threads, hardware resources, etc. Alternative, the advisor program could comprise executable program code which executes as a separate process. In either case, the advisor program is not part of the compiled code of the hosting application.

Figure 3:
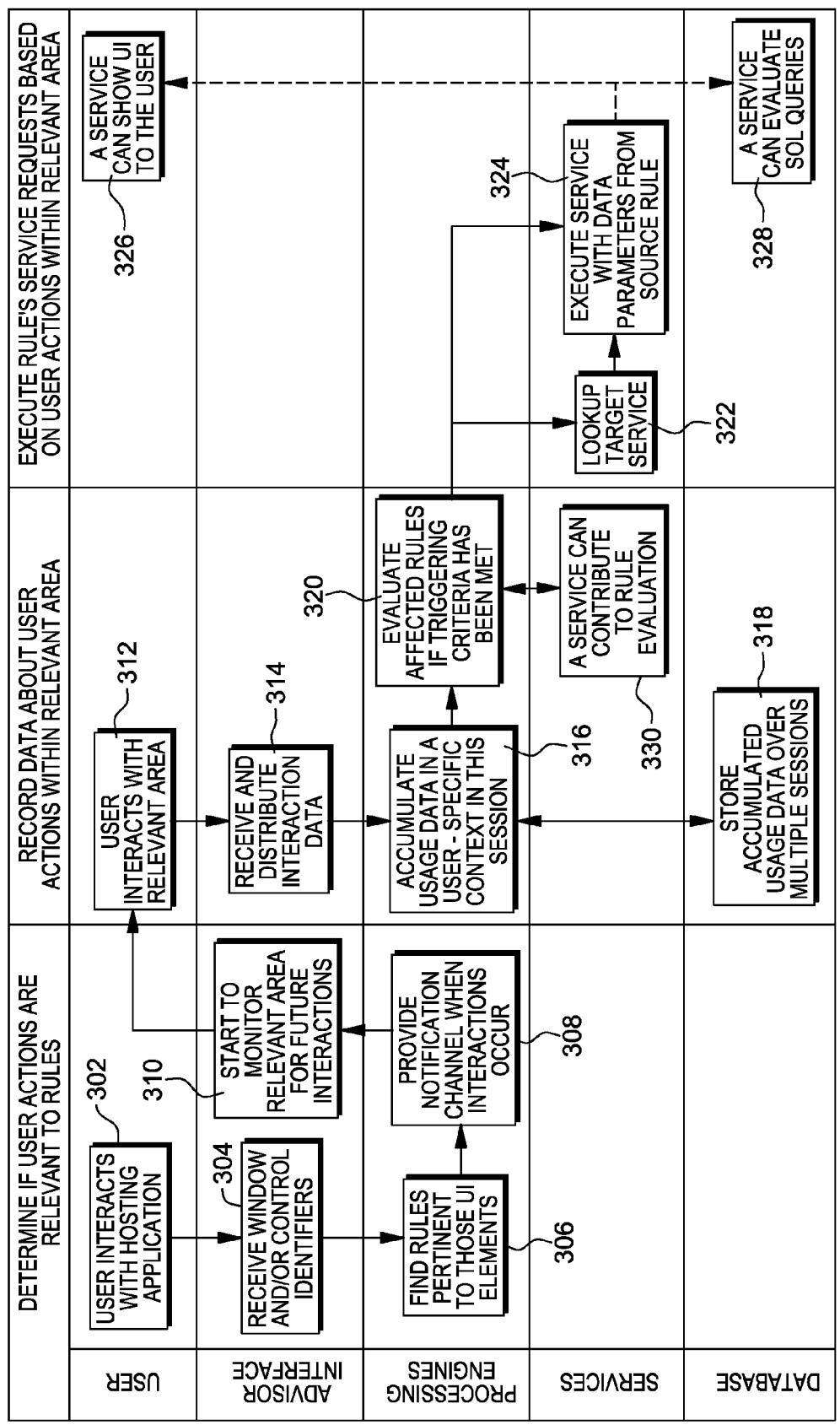
FIG. 3 depicts one example of a process for rule-based triggering of services by an advisor program, in accordance with one or more aspects of the present invention.

An example sequence of events in a rule-based approach for triggering execution of services by an advisor program is described and depicted with reference to FIG. 3. The process begins with a user interacting with a hosting application (302). In one example, the user interaction is simply launching the program to commence execution thereof. In another example, the user interaction is interaction with one or more attributes of the application, such as user interface elements of the application.

Thereafter, an advisor program application interface observes that user interaction (304). Interaction is observed via, for instance, a message passing facility, provided by the operating system and/or another framework installed on the user's workstation, such as the .NET Framework offered by Microsoft Corporation. In one example, when a user interacts with one or more attributes of an application executing on an operating system, events are created responsive to that interaction and channeled on a dispatch loop maintained by the operating system. Some operating systems, such as the Windows® line of operating systems offered by Microsoft, use a window manager. A common need within window managers is a means to react to user interaction with the mouse, keyboard, or other input device. A dispatch loop provides a common location where these interaction events can be queued, which enables program(s) to process the events. Thus, these events provide, in one example, information about various aspects of a user's behavior and other interaction with respect to the application, including interaction with user interface elements and other attributes of application. The advisor program application interface can hook to this dispatch loop and thereby receive or observe the events, including properties thereof, such as window and/or control identifiers specified therein indicating the particular attributes of the hosting application that are being interacted with.

The advisor program rule engine (advisor processing engine in FIG. 3) identifies the particular elements or attributes that are being interacted with to find rules pertinent to those user interface elements or attributes (306). For instance, the processing engine identifies whether any of those elements (or sub-elements thereof) are specified in the criteria portion of one or more of the rules that have been applied to the client workstation. As previously discussed, user behavior with respect to an application element or sub-elements thereof is one example of a building block of triggering criteria specified in a rule. Other example building blocks include system properties, application configuration data, and application user data, which are accessible, in one example, via execution of one or more services specified in a rule, as described above.

The specification of an application element in a criteria portion of a rule indicates an interest in obtaining data about that element. In one example, obtaining data about an element includes monitoring the element and/or user behavior with respect to that element. Consequently, the processing engine, in response to finding rule(s) pertinent to an application element that was interacted with (such as a rule that is interested in interactions with a sub-element of the element being interacted with), provides one or more notification channels for detecting when further interactions occur (308). If one or more of the rules are interested in user behavior with respect to an application attribute that is a sub-element of an element that was just interacted with, the advisor program creates a channel such that new user interactions with this attribute are piped directly to the rule engine. In one example, this is facilitated through the provision by the operating system of a way for advisor program application interface to register a return hook (in one example, code provided by the advisor program) with the dispatch loop. Some operating systems provide a manner in which additional program code can participate in an application's dispatch loop by routing, e.g., user input events (e.g. interaction with a mouse, keyboard, or other input devices) to program code installed dynamically (e.g. at runtime), which is enabled by the application making system calls to routines provided by operating system libraries. A parameter to these routines contains a reference (such as a function pointer or address in memory to set the program counter register), to the program code to be called, thus causing a call of the return hook should a particular event (for instance one which is interesting to one or more of the rules) be processed from the dispatch loop. In this manner, the advisor program application interface begins to monitor relevant area(s) of the application for, e.g., future user interactions therewith (310).

Only if there is a pertinent rule will further information and/or statistics be gathered and delivered, and more specifically with respect to this example will information about user behavior with respect to a particular attribute of the application be gathered/delivered. For instance, a rule may specify as part of its triggering criteria that repeated user interaction with a particular selection box on a particular worksheet in the application is to cause triggering of an advice service that displays advice to the user in order to eliminate the inefficiency in the user repeatedly selecting the same value for that selection box. Using this example, upon an event indicating interaction with the worksheet by the user, for instance when the user selects the worksheet for display on the screen, the rule is deemed pertinent because there is a possibility, by virtue of the worksheet being made active on the user's screen, for the user to interact with the selection box on that worksheet. The processing engine, responsive to the event of opening the worksheet, provides a notification channel that monitors for interaction with the selection box, and the advisor program application interface begins to monitor the selection box for future interactions by the user. It can be seen that the monitoring of user activity focuses on only particular attributes of the product about which rules have been created and implemented on the client workstation, in order to limit the scope of what is being observed. Instead of arbitrarily examining all of the user's behaviors with all attributes of the entire application, only those areas of the application about which a rule criterion is directed are examined, so that there is minimal impact on the user from a system performance standpoint. Furthermore, this enables services provided responsive to triggering of a rule (described below) to be targeted to exactly what the user is doing, ensuring that any advice provided is relevant to the user in both timing and substance, rather than an alternative broadcast approach whereby usage advice is provided in the form of randomized tips or other generalized user advice.

One example of hooking to the dispatch loop to learn of specific events is to utilize a subclass hook in order to effectuate preemptive or post-facto control of a system component, such as the CPU, after a specific event is processed. If the user opens a particular screen and a rule exists which, as part of its triggering criteria, is interested in a 'grid' on the screen, the advisor system can listen to the screen (by way of events on the dispatch loop) and wait for observed interaction with the grid. Upon interaction with the grid, the grid can be subclassed to obtain a direct channel into all interactions with that particular control. Subclassing, as those having ordinary skill in the art will recognize, allows additional code to react to a subset of user inputs directed at, e.g., a single window or control of the application. This can be achieved through the 'WndProc' function created following standard practice for application running on the Windows® line of operating systems offered by Microsoft. When another body of code needs to process user interactions, an alternative means of listening to further user interactions is via subclassing which, in the case of Windows®-based application, replaces the 'Wnd- Proc' address used by the operating system with a substitute—i.e. the address of the additional body of code. The old address of the 'WndProc' can still be used by the additional body of code in a chained call. One advantage of subclassing a control of interest is that it notifies of only relevant events, thereby eliminating the need to filter each message occurring within the application to identify messages associated with just the control of interest.

The hosting application, as part of its coding, uses discrete identifiers for identifying attributes of the application. These discrete identifiers are used in building information of an event passed to the dispatch loop. The discrete identifiers include attribute names, and attributes in the software can be identified using an attribute name from this set of identifiers, and can include either a customized or conventional name for the application attribute. The identifier can be used in rule specification to accurately identify application attributes in a manner that is consistent with the way the hosting application identifies the application attributes. This enables the advisor program to, for instance, use the identifiers in obtaining data about the application attributes. When a user interacts with the attribute, for instance toggles a dialog control causing an event to be reported, that interaction can be identified based on the attribute name provided in the event. This facilitates identifying the user behavior (e.g. toggling) with respect to the particular attribute (e.g. dialog control) of the application, in that reported events can be examined for the particular discrete identifier of a relevant application attribute. An event which reports that a window was opened might provide as part of the event information the title (name) of the window (attribute), the title being a discrete identifier used by the application. According to aspects of the present invention, specification of the rules is therefore made by way of these discrete identifiers, in order for the criteria of the rules to be understandable in the context of the application. When multiple applications host the advisor program, different rule sets can be applied using the respective identifiers of each hosting application. Alternatively, a single rule set can be applied for all hosting applications, or the hosting applications may employ a common set of identifiers.

Returning to FIG. 3, responsive to the user interacting with a relevant area or application attribute (312), such as one that is deemed relevant by virtue of it being specified in the criteria of one or more rules, the advisor program application interface receives and distributes interaction data (314) to the advisor processing engine of the advisor program. The interaction data includes information provided in the event reporting the interaction, such as the discrete identifier of the attribute that was being interacted with (e.g. "DialogControl1") and the nature of that interaction (e.g. 'toggles on' or 'toggled off'). The processing engine builds a user behavior state by accumulating this interaction data within the context of the present application session (316). The behavior of the user with respect to the relevant attributes of the application is accumulated over a period of time to form a behavior state based on what is indicated in the rules as being relevant user behavior for monitoring. By way of example, if the triggering criteria of a rule is interested user interaction with a quantity input control in a particular area of the application three or more times without changing the entity on which the user operates (i.e. value in that quantity control), then the user behavior of selecting the control the first time, a second time, and a third time will be accumulated, each time building-up the behavior state with respect to that control based on the repeated interaction. Not only can interaction data be accumulated within the present application session, but additionally, the accumulated interaction data can be stored over multiple prior sessions with the application (318). A session is, in one example, some period of time during which the user interacts with the application and attributes thereof. In one example, a session extends from the time of opening or launching the application or an individual module until that application or module is exited or navigated away-from by the user. A built application state can therefore include data obtained across multiple sessions, and a built user behavior state of the application state can include user interaction data across the multiple sessions. In this manner, the buildup of user behavior state incorporates interaction data from previous and present interactions, enabling triggering of rule criteria based on non-serialized (i.e. out-of-sequence and/or out-of-order) interaction, if so desired.

More generally, the user behavior state can be part of an broader application state that is built from data obtained after identifying the relevant application attributes. relevant application attributes identified in the rule can include system properties (such as the browser installed on the workstation, particular hardware resources present, etc.), application configuration information, and/or application user data. Similar to the above, obtaining the data about these attributes could include monitoring the attributes over a period of time and building an application state based on the monitoring and including the obtained data in the built application state.

In addition to accumulating usage data, the advisor processing engine of the advisor program will evaluate affected rule(s) to determine whether the triggering criteria for those rule(s) is met based on the application state (320). In one example, the triggering criteria are specified in the form of one or more logical expressions, and the one or more logical expressions are evaluated to be either true or false. Triggering criteria is met when the logical expression(s) specified in the rule evaluates to true, meaning the criteria necessary for triggering the services specified by the rule are present. This is explained in further detail below with reference to FIGS. 5 and 6. Additionally, as noted above, a service specified in a rule can contribute to rule evaluation (330). For instance, a service specified in a rule might cause information such as system property information, application configuration information, or application user data to be obtained and used as part of the triggering criteria for the rule. If the triggering criteria of a rule is met, the advisor processing engine commences execution of the service request(s) made in that rule. This includes looking up each target (requested) service (322) specified in the rule, and executing the service (324), optionally using data parameters provided as part of the specification of the rule. In the example of FIG. 3, two types of advisor services are illustrated. The first executes to present a user interface to the user (326), for instance by highlighting a particular application attribute or portion of the screen, or displaying usage advice. In the latter example, a data parameter provided as part of the specification of the rule could be the advice message string that is to be presented to the user. The second service illustrated in FIG. 3 executes to evaluate one or more SQL queries (328), for instance from an advisor database. Queries that can be run might lookup information about the configuration of the application or user data stored by the application, to enable execution of services to be based on the specific application configuration information and/or user data stored in a database.

While the example of FIG. 3 illustrates two services triggered in response to the triggering criteria being satisfied, any number and type of services could be triggered. Below are just some examples of what activity execution of a service in the computing environment might perform:

Display a Message or Other Content, Such as Usage Advice:

The message could comprise a preformed set of presentation content, defined in the specification of the rule, and for display to the user as a result of that user performing certain behaviors in/to the product, as specified in the criteria for the rule.

Put More Data into the Feedback Channel (228b of FIG. 2):

A service could comprise a feedback component that rules can leverage in order to provide feedback to the hosting product's company about how the rule was received by the end user. This can in turn enable the company to consume and analyze that feedback in order to further refine existing rules, tailor additional rules for deployment, etc. based how the rule was received by the user. In one example, feedback provides additional data that indicates whether the services specified in the rule are accomplishing the purpose for which the rule was initially deployed, for instance to eliminate an inefficiency in user behavior with respect to navigation or feature-use within the application.

Callout to a Backend Web Service:

A service may be executed to call to a backend service, such as a web service to perform an update or deletion to a module of the application, to download and install other modules of the application, and/or to perform a data fix-up of application configuration information or application user data. In one example, a rule can be implemented where, when it is indicated based on user behavior that the user may benefit from an additional piece of software available from the hosting product's company, the rule invokes a service to automatically download and/or install the piece of software.

Enable/Disable Other Rules:

A service can actuate (toggle) a rule on or off, which enables observation of particular behavior for a specifiable window of time, for instance two weeks. In another example, a service can enable another rule specifically defined to provide targeted feedback to the application developer, rather than the service itself providing the feedback.

Query the Product Database/Configuration:

A service can query application configuration information and/or user data by querying a database, in one example, having data about the configuration options for the application or user data stored by the application.

Figure 4:
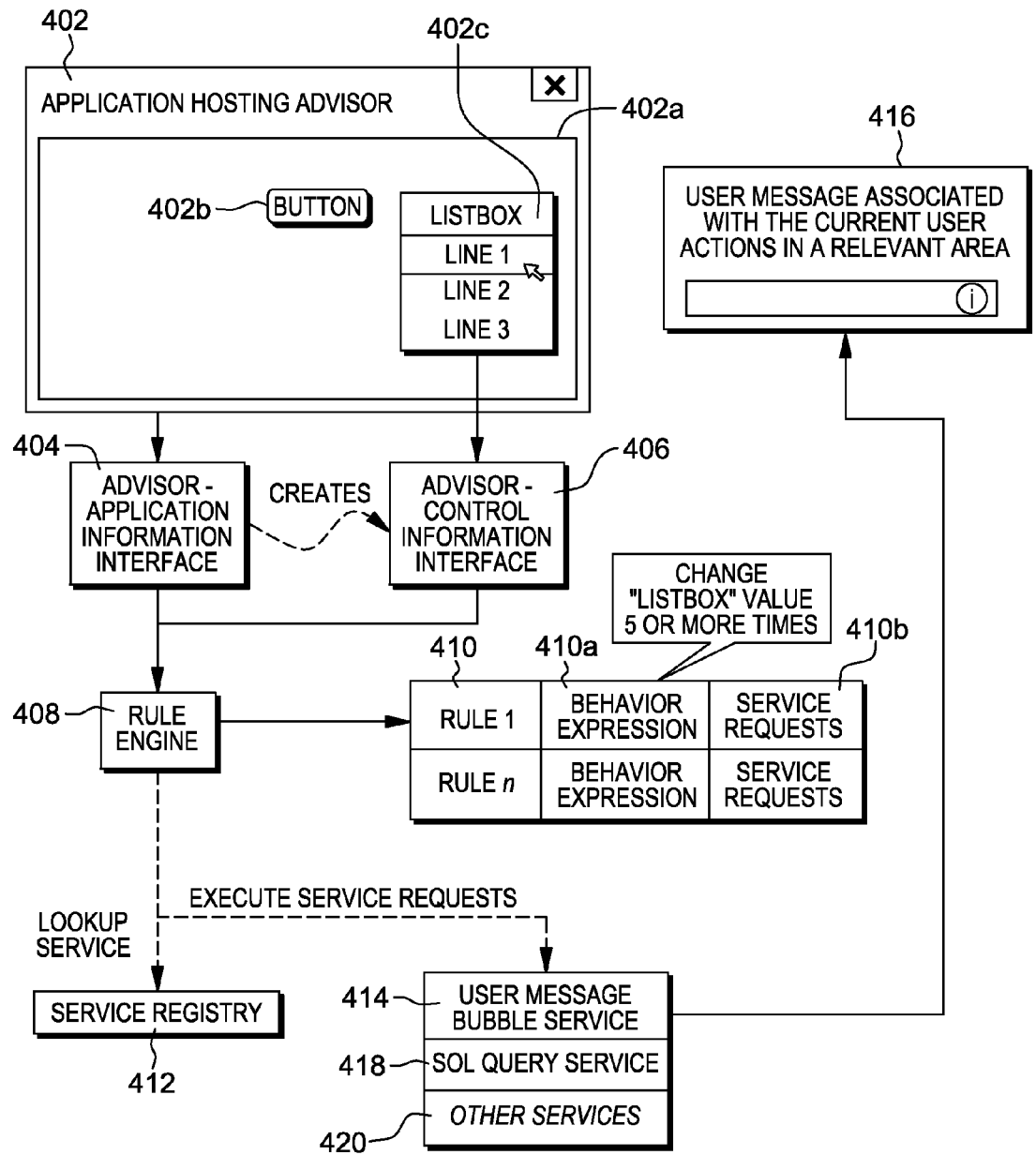
FIG. 4 depicts advisor program activities in association with a specific example of rule-based triggering of services, in accordance with one or more aspects of the present invention.

FIG. 4 depicts advisor program activities in association with a specific example of rule-based triggering of services, in accordance with one or more aspects of the present invention. In this example, the rule criteria of a rule specifies that the user changes a selection control, titled "Listbox", five or more times. An application 402 hosting the advisor program displays a screen 402a with user interface (UI) elements, e.g. button 402b and Listbox 402c. An advisor-application information interface 404 listens to events, e.g. from a dispatch loop, for initial pertinent user-behavior related information (for instance opening up screen 402a having button 402b and Listbox 402c). Since Rule 1 (410) is interested in user behavior with respect to Listbox 402c, advisor-application information interface 404 creates, in one example responsive to an event such as the opening of screen 402a, an advisor-control information interface 406 in order to obtain data about control 402c, i.e. to directly observe any user interaction occurring on control 402c. The user interaction data on both advisor-application information interface 404 and advisor-control information interface 406 is provided to rule engine 408. Rule engine evaluates Rule 1 (410) and other installed rules on the workstation based on buildup of application state (in this example, the built-up user behavior state). In FIG. 4, Rule 1 (410) specifies triggering criteria (behavior expression 410a) of 'changing the value in Listbox 402c five or more times'. Thus, as the user changes the value of Listbox 402c, these interactions are observed on advisor-control information interface 406 and the behavior state is built-up over time with each successive user interaction to change the value of Listbox 402c. The rule is evaluated based on this buildup of behavior state and may be triggered if the criteria evaluates to true. Assuming that the user changes the value of Listbox 402c five or more times, services specified by service requests 410b are looked up in a service registry 412. In one example, service registry contains a list of service names mapped to executable code and is configured by the advisor program and/or hosting application. Each service specified in service requests 410b, assuming the respective service is found in service registry 412, is executed, optionally using data contained inside the rule or obtained responsive to executing a service specified in the rule to obtain the data. In FIG. 4, one service requested is a user message bubble service 414 which executes to display user message 416 having a message specified in service requests 410b of Rule 1 (410). Rule 1 (410) also requests an SQL query service 418 and other services 420, which are also executed upon triggering of Rule 1 (410).

The scope of possibilities in the triggering criteria employed and services requested in the deployed rules is virtually infinite. Rules can be based on any combination of user behavior with respect to attributes of the application, system properties and other workstation variables (such as what web browser is installed on the system), application configuration information, and application user data stored by the application, as examples. Additional examples of rules, specified in plain English but readily implementable as triggering criteria and service requests within a rule include:

(i) A user has never opened a particular screen within the application but he/she has used a feature, located somewhere else in the product, which is related to that screen. In this case, it might be beneficial to trigger one or more services that alert the user to the presence of that screen in the product, so that the user can more directly access the feature and/or related features.

(ii) A user has entered on multiple occasions a screen housing a particular control but has never entered data in that control. This can indicate that the user may not be aware of the presence of the control or what it does, in which case a service could be triggered to apprise the user of the control and its function. In this regard, the user behavior relevant to triggering the rule is based at least partially on the user's non-action (lack of interaction with the control).

(iii) A user who has run reports related to a single customer multiple times has never used a particular list box that might provide that same information in a different way. It might be beneficial to draw the user's attention to the list box and its function.

(iv) A user opens any of a number of list views a threshold number of times within a defined time period, has never used a management center module of the application (directed to providing the user with the list view information in an easier and more streamlined manner), and has version N or above of the application. An advice message could be provided indicating that the management center modules allow the user to obtain detailed information about the user's customers, vendors, and items at a glance. Also, from the developer's perspective, feedback-based success measurement/criteria for this rule could be the percentage of customers who, after receiving the message, open one or more management center modules a particular number of times within a particular time frame, and a service to enable a separate rule for obtaining and reporting this feedback could be executed.

(v) A user views a Customer Transaction History Report but has never opened the View Related Transactions list. An advice message could be displayed indicating to the user that related transactions (such as a purchase order being turned into a purchase or a quote being turned into an invoice) can be found using the View Related Transactions feature. Success measurement/criteria for this rule could be that the user opens the Related Transactions link at least X number of times within a particular time frame.

(vi) User opens an Aged Receivables report and has transactions in the last aging bracket with an unpaid status, but has no receipt transactions with a reference number of "WO" (to indicate a write-off of an unpaid transaction). An advice message could be displayed indicating that if a user knows that a customer is not going to pay, the invoice can be written-off without deleting it, in order to keep a record of the invoice and account for the user's loss. Success measurement/criteria for this rule could be that an invoice was paid off using the "WO" indicator in the invoice's reference number field within X number of days after the message was displayed for the user.

In one embodiment, rule criteria are specified through one or more logical expressions and may include nested logical expressions. Logical expressions include specification of expression elements, such as 'constant' values or application attributes for which related user behavior is examined in evaluating the rule triggering criteria. One example of a logical expression is described with reference to FIG. 5, which depicts a tree diagram graphically illustrating example rule criteria of a rule, in accordance with one or more aspects of the present invention. The rule criteria implemented in the illustrated tree diagram is: For version N or higher of the hosting application, user selected drop ship on a Sales Invoice screen today and has at least 5 purchase orders which occurred 10 times in a month.

Figure 5:
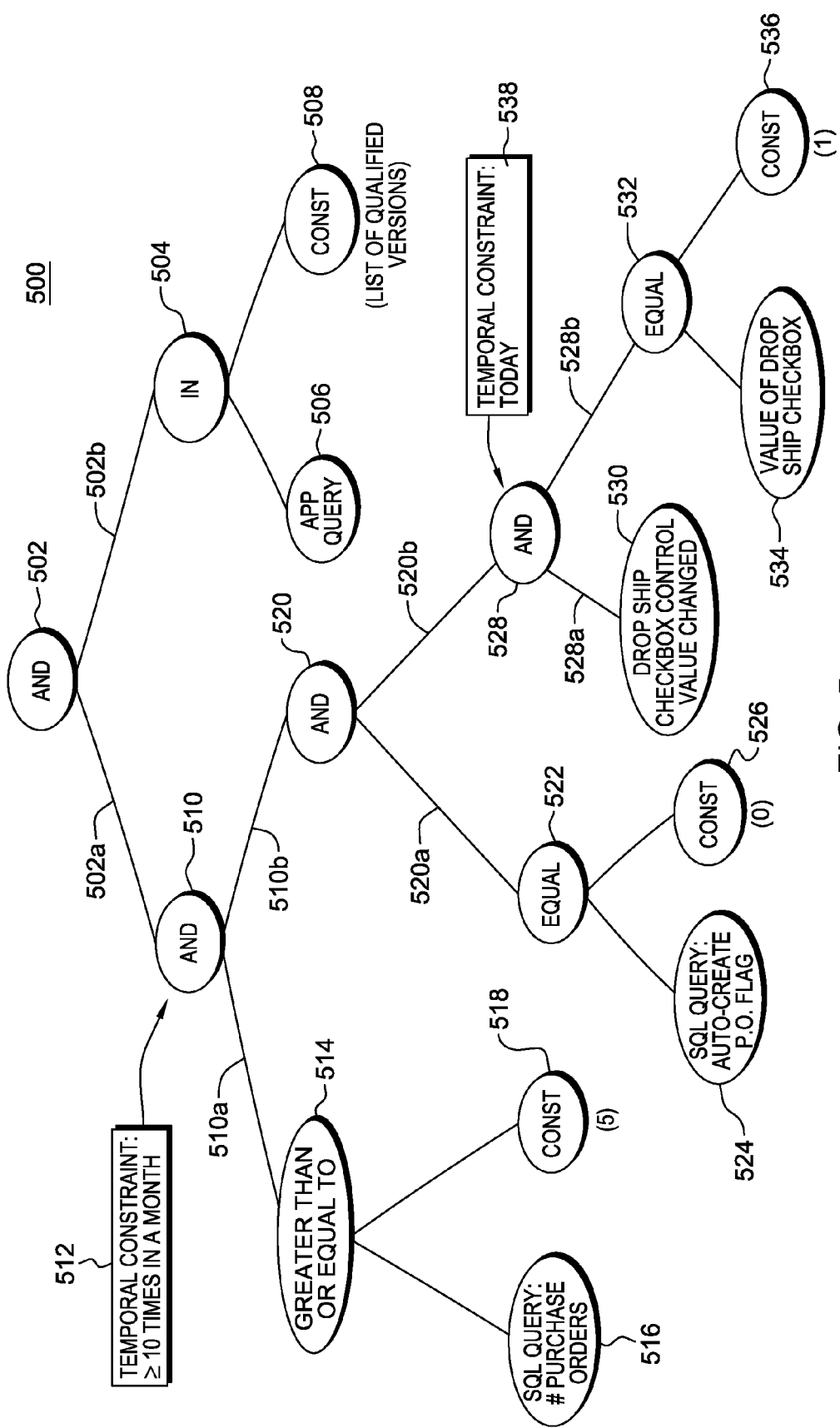
FIG. 5 depicts a tree diagram graphically illustrating example rule criteria of a rule, in accordance with one or more aspects of the present invention.

In FIG. 5, tree 500 is rooted at node 502, which is a logical AND expression having a left expression 502a and right expression 502b. Since AND expression 502 is the root of tree 500, the evaluation of root 502 (which encompasses an evaluation of the left expression 502a and right expression 502b) constitutes an evaluation of the entire rule criteria.

Beginning with right expression 502b (for description purposes, and without implicating an order in which the expression is evaluated), expression 504 is an "IN" expression in which an application query 506 is made in order to determine the current version of the hosting application. In one example, the product database and configuration information (222 in FIG. 2) is queried to make this determination. Expression 504 implements the, "For version N or higher of the hosting application" constraint of the rule criteria recited above. The "IN" expression compares the current version of the application, returned responsive to the application query, with a list of constants 508 comprising a list of qualified versions of the application. The qualified versions of the application would list, in this case, versions N and above. In one example, the list of qualified versions is provided as data within the rule criteria, but the list could alternatively be provided elsewhere and referenced by the rule criteria. If the queried version number is N or above, "IN" expression 504 will evaluate to true, and therefore right expression 502b of AND expression 502 will evaluate to true. If the current version of the application is not in the list of qualified versions, i.e. is it below version N, then IN expression 504 and consequently AND expression 502 will evaluate to false, and the rule criteria will not be met for triggering the rule.

Left expression 502a itself comprises an AND expression 510 having left expression 510a and right expression 510b. Additionally, a time constraint 512 is associated with AND expression 510. Time constraint 512 requires that the actions specified in expression 510 be performed at least 10 times in a month period, and thus implements the, "which occurred 10 times in a month" constraint in the rule criteria recited above. Time constraint 512 is a threshold which must be met for left expression 502a to evaluate to true; if expression 510 is satisfied only 9 times within the past month, left expression 502a will not evaluate to true because time constraint 512 has not (yet) been satisfied. In this manner, the time constraint can correspond to a period of time during which application state is to be build via monitoring relevant application attributes and/or user interaction with the relevant application attributes. For purposes of example only, other time constraints might specify 'that an action has never been taken', 'that the action has happened 5 times' (ever, or since install of the application, for instance), 'that the action has happened 5 times in the last 2 months', or 'that the action which comprises an action having occurred 5 times in an hour has happened 3 times in the last week', as examples.

Left expression 510a of expression 510 implements the "has at least 5 purchase orders" constraint in the rule criteria recited above. A "GREATER THAN OR EQUAL TO" expression 514 is evaluated in which a number of purchase orders is queried 516 (for instance via a service specified in the rule itself, or via a remote service referenced by the logical expression, to query the application user data which indicates the number of purchase orders) and compared to a specified constant 518, which is 5 in this example. Expression 514 evaluates to true if the queried number of purchase orders is 5 or more.

Right expression 510b includes another AND expression 520. This expression implements the "user selected drop ship on a Sales Invoice screen today" aspect of the rule criteria. Left expression 520a of expression 520 includes an EQUAL expression 522 to determine whether an auto-create purchase order flag (which is application configuration information that is queried) 524 is equal to a constant, "0" 526. This aspect of the expression is interested in whether the user has configured the application to automatically create purchase orders. If the user has not configured the application in this way, then the advisor program may, in one example as part of a triggered service, advise the user to enable the automatic creation of purchase orders. Right expression 520b includes an AND expression 528, which has a left expression 528a indicating true if the drop ship checkbox control value changed 530, and false otherwise. In implementing the detection of this change in value, user behavior with respect to this control value attribute of the application is monitored. In one example, a change event is listened-for on the drop ship checkbox control on the Sales Invoice screen. Receipt of the event indicates that the drop ship checkbox was changed, i.e. from being checked to unchecked, or from being unchecked to checked. Right expression 528b of AND expression 528 checks to determine which of the two—checked or unchecked—the user has changed the drop ship checkbox to indicate. Right expression 528b includes an EQUAL expression 532 which returns true if the value of the drop ship checkbox 534, after being changed, is equal to constant "1" (indicating it is checked) 536, and false otherwise. Expression 528 therefore determines whether (i) the drop ship checkbox control value changed and (ii) if it did change, whether it was changed to "1" which corresponds to being checked.

Additionally, time constraint 538 is associated with expression 528 in that the action by the user to change the drop ship checkbox control value must have been performed today in order for expression 528 to evaluate to true. In this manner, multiple time constraints can be placed on differing rule criteria, and the time constraints can be applied to nested expressions (e.g. 528 and 510).

Those having ordinary skill in the art will appreciate that there are many valid supported expression terms that can be used in a logical expression of a rule. A logical expression of a rule can include any logical expression term including AND, OR, NOT, NAND, NOR, XOR, etc. Similarly, usable comparison expressions include EQUAL (=) and GREATER THAN OR EQUAL TO (>=) (as depicted in FIG. 5), as well as NOT EQUAL TO (!=), GREATER THAN (>) and LESS THAN (<), and LESS THAN OR EQUAL TO (<=), among others.

In one embodiment, the logic to implement a rule, including the criteria and service requests thereof, is html/xml based, i.e. written in an Extensible Markup Language (XML) format or variant thereof. This approach is advantageously different from an approach in which the rule is programmed using strict logic, such as compilable/compiled program code. Separation of the defined rules and the rule engine itself, which in one example is executable code on the workstation, advantageously enables the application developer to describe a rule to a user's system, which then implements the rule on the system apart from any modifications to the programming code of the application. The developer can cause messages to be provided to targeted users at any time. This is useful in a situation where a developer's application support center experiences a spike in a particular kind of support request for the application. In such a case, the developer can quickly define rule(s) that will target the users who experience, or who may experience, the subject support issue, i.e. those customers experiencing the kinds of problems driving the support call, and deploy the rule(s) to the workstations of those users, without requiring, for instance, a program code update to the application which could take a significantly longer amount of time to both develop and deploy.

Use of the above approach enables flexibility in rule creation, modification, and design. For instance, the application developer can receive indications based on observed user behavior, user feedback, etc. of a problem that affects users of the application, and can then react to those indications by specifying and/or modifying rule(s) to vet-out a target audience for receiving a rule to address the problem. The developer can create rule(s) that will observe and report which users are, or may be, experiencing the problem. Additionally during this process, the developer will identify one or more aspects of the users' usage of the application where a solution to the problem (for instance provision of advice or guidance) would be useful, and can respond by developing and deploying rules that directly address and most accurately align with the needs of users who experience, or may potentially experience, the problem.

As described above, rules can be constructed based on identified problems. Additionally or alternatively, rules can be constructed based on any other desired reason including, but not limited to: the way in which a marketing department of the product developer wishes to present new and/or additional features to the users, the way in which customer support & sales departments wish to impact the customer users in order to leverage additional business opportunities between the users and developer, to draw attention to aspects of the application that are specifically designed and targeted for particular customers' use cases, and to identify the use cases where particular advice would be welcome.

FIG. 6 depicts an example of an XML-based rule format using descriptive data elements, in accordance with one or more aspects of the present invention. Rules deployed to customers can be written in XML code in the format depicted, and deployed as a package to the customer workstations, in one example. In FIG. 6, rule 602 includes description 604, version indication 606, enabled flag 608, criteria portion 610, and actions portion 612. Description 604 includes a description of the rule, which can be provided for clarity and explanation as to the rule's purpose and direction. Version indication 606 indicates a version of the rule, since a rule may undergo revisions over time as feedback is received about how the rule is being received by customers (e.g. whether the rule is working for its intended purpose). Enabled flag 608 is used to either enable or disable a rule. A rule can optionally be enabled or disabled depending on whether the rule is to be enforced at a particular time. Additionally, in one example, rules can enable other rules. This helps to ensure that only behavior which is relevant and necessary for observation at the current time is being observed, and that further behavior, for instance behavior specified in other related rules, is not being observed presently.

Criteria portion 610 includes one or more criteria. In FIG. 6, criteria portion includes a single criterion which is an AND expression having an associated description, and a left expression (which is an IN expression and which code thereof has been omitted by collapsing the left expression) and a right expression (which is AND expression and which code thereof has been omitted by collapsing the left expression). Further details of the left and right expressions (i.e. code thereof) has been omitted in FIG. 6.

Actions portion 612 includes one or more service requests, specified, in this example, as action data containers. In the example of FIG. 6, action data containers have associated with them a type (e.g. "SignalActionDataContainer") and, in the case of a signal service, signal type (e.g. "Action Passed" or "Action Failed") indicating for the signal service functional activity to perform depending on whether the action is passed or failed. Further details of the action data containers has been omitted (i.e. code thereof has been omitted by collapsing the Action data containers) from FIG. 6.

Five further example XML-implemented rules in accordance with aspects of the present invention are provided below. The rules below are subject to copyright protection. The copyright owner, Sage Software, Inc., has no objection to the facsimile reproduction by anyone of the patent disclosure, as it appears in the Patent and Trademark Office patent files or records of any country, but otherwise reserves all rights whatsoever.

Example 1:

```xml
<Rule>
    <Description>Rule #14 - User checks Drop Ship on Sales Invoicing, has POs, and has auto create PO off.</Description>
    <Version>2</Version>
    <Enabled>true</Enabled>
    <GUID>cd2785e2-1c33-418d-bd1e-3bb7e5216209</GUID>
    <Criteria xsi:type="AndExpression">
      <Description />
      <Version>2</Version>
      <IsVirtualRoot>false</IsVirtualRoot>
      <Key>39a9a7ea-7aeb-4ab4-b300-c4d3c4b7c2e1</Key>
      <TemporalConstraints />
      <IsPassive>false</IsPassive>
      <Left xsi:type="AndExpression">
        <Description />
        <Version>2</Version>
        <IsVirtualRoot>false</IsVirtualRoot>
        <Key>00000000-0000-0000-0000-000000000000</Key>
        <TemporalConstraints />
        <IsPassive>false</IsPassive>
        <Left xsi:type="AndExpression">
          <Description />
          <Version>2</Version>
          <IsVirtualRoot>false</IsVirtualRoot>
          <Key>e0db3eaf-77f9-4cee-857e-754203e18ca1</Key>
          <TemporalConstraints>
            <TemporalConstraint>
              <Version>2</Version>
              <Threshold>10</Threshold>
              <ThresholdOperator>GreaterThanOrEqual</ThresholdOperator>
              <TimeWindowSize>1</TimeWindowSize>
              <TimeWindowUnit>Month</TimeWindowUnit>
              <EraseHistory>true</EraseHistory>
            </TemporalConstraint>
          </TemporalConstraints>
          <IsPassive>false</IsPassive>
          <Left xsi:type="ControlValueChangedExpression">
            <Description />
```

```xml
      <Version>2</Version>
      <IsVirtualRoot>false</IsVirtualRoot>
      <Key>00000000-0000-0000-0000-000000000000</Key>
      <TemporalConstraints />
      <IsPassive>false</IsPassive>
      <WindowIdentifiers>
        <WindowIdentifier>
          <Version>2</Version>
          <HostWindowId>SalesInvoicing</HostWindowId>
          <ControlId>285</ControlId>
          <HostWindowIdIsPattern>false</HostWindowIdIsPattern>
        </WindowIdentifier>
      </WindowIdentifiers>
      <VariableName>DropShipCheck</VariableName>
    </Left>
    <Right xsi:type="EqualExpression">
      <Description />
      <Version>2</Version>
      <IsVirtualRoot>false</IsVirtualRoot>
      <Key>00000000-0000-0000-0000-000000000000</Key>
      <TemporalConstraints />
      <IsPassive>false</IsPassive>
      <Left xsi:type="ValueOfExpression">
        <Description />
        <Version>2</Version>
        <IsVirtualRoot>false</IsVirtualRoot>
        <Key>00000000-0000-0000-0000-000000000000</Key>
        <TemporalConstraints />
        <IsPassive>false</IsPassive>
        <VariableName>DropShipCheck</VariableName>
        <FieldIndex xsi:nil="true" />
        <ResultType xsi:nil="true" />
      </Left>
      <Right xsi:type="ConstantExpression">
        <Description />
        <Version>2</Version>
        <IsVirtualRoot>false</IsVirtualRoot>
        <Key>00000000-0000-0000-0000-000000000000</Key>
        <TemporalConstraints />
        <IsPassive>false</IsPassive>
        <Value xsi:type="xsd:int">1</Value>
      </Right>
    </Right>
  </Left>
  <Right xsi:type="AndExpression">
    <Description />
    <Version>2</Version>
    <IsVirtualRoot>false</IsVirtualRoot>
    <Key>00000000-0000-0000-0000-000000000000</Key>
```

```xml
<TemporalConstraints />
<IsPassive>false</IsPassive>
<Left xsi:type="EqualExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Left xsi:type="QueryExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Query>
      <Version>2</Version>
      <ActionDataHeader>
        <Classification>ProductSQLAction</Classification>
        <Version>2</Version>
        <Id>64515983-1ed4-4350-906c-d68676efc9bb</Id>
        <IsExecutionVoter>false</IsExecutionVoter>
        <DependentUponId>00000000-0000-0000-0000-000000000000</DependentUponId>
        <DependentUponIdFailure>false</DependentUponIdFailure>
      </ActionDataHeader>
      <ProductSQLData>
        <SQL>
          SELECT CAST(ATCrtPODropShip AS INTEGER)
          FROM General_Inv WHERE AcctgModule=7
        </SQL>
        <ConnectionName>DEFAULT</ConnectionName>
        <SqlType>Scalar</SqlType>
        <ParameterTokens />
        <Classification>ProductSQLAction</Classification>
      </ProductSQLData>
    </Query>
    <Parameters />
  </Left>
  <Right xsi:type="ConstantExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Value xsi:type="xsd:int">0</Value>
  </Right>
```

```xml
</Left>
<Right xsi:type="GTEExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Left xsi:type="QueryExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Query>
   <Version>2</Version>
   <ActionDataHeader>
    <Classification>ProductSQLAction</Classification>
    <Version>2</Version>
    <Id>d0ffaac7-5f27-442c-ba85-4b2ebfc193b4</Id>
    <IsExecutionVoter>false</IsExecutionVoter>
    <DependentUponId>00000000-0000-0000-0000-000000000000</DependentUponId>
    <DependentUponIdFailure>false</DependentUponIdFailure>
   </ActionDataHeader>
   <ProductSQLData>
    <SQL>
     SELECT COUNT(*)
     FROM JrnlHdr WHERE JrnlKey_Journal=10 AND
     DATEDIFF(Day, TransactionDate, Current_Date()) < 30
    </SQL>
    <ConnectionName>DEFAULT</ConnectionName>
    <SqlType>Scalar</SqlType>
    <ParameterTokens />
    <Classification>ProductSQLAction</Classification>
   </ProductSQLData>
  </Query>
  <Parameters />
 </Left>
 <Right xsi:type="ConstantExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Value xsi:type="xsd:int">5</Value>
 </Right>
```

```xml
    </Right>
   </Right>
  </Left>
  <Right xsi:type="InExpression">
   <Description />
   <Version>2</Version>
   <IsVirtualRoot>false</IsVirtualRoot>
   <Key>00000000-0000-0000-0000-000000000000</Key>
   <TemporalConstraints />
   <IsPassive>false</IsPassive>
   <Left xsi:type="QueryExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Query>
     <Version>2</Version>
     <ActionDataHeader>
      <Classification>ApplicationDataAction</Classification>
      <Version>2</Version>
      <Id>00000000-0000-0000-0000-000000000000</Id>
      <IsExecutionVoter>false</IsExecutionVoter>
      <DependentUponId>00000000-0000-0000-0000-000000000000</DependentUponId>
      <DependentUponIdFailure>false</DependentUponIdFailure>
     </ActionDataHeader>
     <ApplicationData>
      <Version>2</Version>
      <Token>CompanyFlavor</Token>
      <Classification>ApplicationDataAction</Classification>
     </ApplicationData>
    </Query>
    <Parameters />
   </Left>
   <Right xsi:type="ConstantExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Value xsi:type="ArrayOfAnyType">
     <anyType xsi:type="xsd:string">PCW</anyType>
     <anyType xsi:type="xsd:string">PPA</anyType>
     <anyType xsi:type="xsd:string">PPAA</anyType>
     <anyType xsi:type="xsd:string">PPAC</anyType>
     <anyType xsi:type="xsd:string">PPAD</anyType>
     <anyType xsi:type="xsd:string">PPAM</anyType>
```

```xml
        <anyType xsi:type="xsd:string">PPAN</anyType>
        <anyType xsi:type="xsd:string">PTX</anyType>
        <anyType xsi:type="xsd:string">PTXA</anyType>
      </Value>
    </Right>
  </Right>
</Criteria>
<Actions>
  <ActionDataContainer>
    <Version>2</Version>
    <ActionDataHeader>
      <Classification>BubbleAction</Classification>
      <Version>2</Version>
      <Id>ef589b41-69f0-444e-bd1b-5f94f921b878</Id>
      <IsExecutionVoter>true</IsExecutionVoter>
      <DependentUponId>00000000-0000-0000-0000-000000000000</DependentUponId>
      <DependentUponIdFailure>false</DependentUponIdFailure>
    </ActionDataHeader>
    <BubbleActionData>
    <Name>Need to order more items?</Name>
    <Description>Purchase orders can automatically be created for items as needed when you create sales transactions.</Description>
    <Version>2</Version>
    <MessageID>2cf21748-4bf4-4969-921d-162d6bef2c87</MessageID>
    <MessagePath>autocreate_purchase_orders.htm</MessagePath>
    <Height>200</Height>
    <Width>400</Width>
    <XParentOffset>-100</XParentOffset>
    <YParentOffset>-130</YParentOffset>
    <ArrowCorner>None</ArrowCorner>
    <ShowAgain>false</ShowAgain>
    <MessageType>ProductivityTip</MessageType>
    <InitialDelay>0</InitialDelay>
    <WndID>
      <Version>2</Version>
      <HostWindowId />
      <ControlId />
      <HostWindowIdIsPattern>false</HostWindowIdIsPattern>
    </WndID>
    </BubbleActionData>
  </ActionDataContainer>
  <ActionDataContainer>
    <Version>2</Version>
    <ActionDataHeader>
      <Classification>RuleModification</Classification>
      <Version>2</Version>
      <Id>b1691f64-3a3f-4d65-87bc-cb3c22e9097e</Id>
      <IsExecutionVoter>true</IsExecutionVoter>
      <DependentUponId>ef589b41-69f0-444e-bd1b-5f94f921b878</DependentUponId>
```

```xml
        <DependentUponIdFailure>false</DependentUponIdFailure>
       </ActionDataHeader>
       <ActionData>
        <Name>Rule Modification Action</Name>
        <Description>Enable the related PEP Tracking rule.</Description>
        <RuleMod>
         <TargetRuleGuid>4e1e4f45-03cb-4fc1-b01d-24d9fc636c2d</TargetRuleGuid>
         <PropertyMods>
          <PropertyMod>
           <PropertyName>Enabled</PropertyName>
           <PropertyValue>true</PropertyValue>
          </PropertyMod>
          <PropertyMod>
           <PropertyName>StartDate</PropertyName>
           <PropertyValue>now</PropertyValue>
          </PropertyMod>
          <PropertyMod>
           <PropertyName>EndDate</PropertyName>
           <PropertyValue>+30</PropertyValue>
          </PropertyMod>
         </PropertyMods>
        </RuleMod>
       </ActionData>
      </ActionDataContainer>
      <ActionDataContainer xsi:type="SignalActionDataContainer"
signalType="ActionPassed">
       <Version>2</Version>
       <ActionDataHeader>
        <Classification>SignalAction</Classification>
        <Version>2</Version>
        <Id>56af9f18-ad97-4846-9c0c-29b12afe6ebd</Id>
        <IsExecutionVoter>true</IsExecutionVoter>
        <DependentUponId>ef589b41-69f0-444e-bd1b-5f94f921b878</DependentUponId>
        <DependentUponIdFailure>false</DependentUponIdFailure>
       </ActionDataHeader>
      </ActionDataContainer>
      <ActionDataContainer xsi:type="SignalActionDataContainer"
signalType="ActionFailed">
       <Version>2</Version>
       <ActionDataHeader>
        <Classification>SignalAction</Classification>
        <Version>2</Version>
        <Id>aca1381f-9089-4ebb-9f41-087b4a5762c3</Id>
        <IsExecutionVoter>false</IsExecutionVoter>
        <DependentUponId>ef589b41-69f0-444e-bd1b-5f94f921b878</DependentUponId>
        <DependentUponIdFailure>true</DependentUponIdFailure>
       </ActionDataHeader>
      </ActionDataContainer>
     </Actions>
```

```xml
    <MetaDataFields />
<Signature>DhHawBUJPAqoSO0Z6hRwFA4qhPOFCAzLM4nPHBJS/NB15opr2qydmg==</Signature>
    <StartDate xsi:nil="true" />
    <EndDate xsi:nil="true" />
  </Rule>
```

Example 2:

```xml
<?xml version="1.0" encoding="utf-8"?>
<ProductAdvisorRules xmlns:xsi="http://www.w3.org/2001/XMLSchema-instance"
xmlns:xsd="http://www.w3.org/2001/XMLSchema">
  <AdvisorFrequencySettings>
    <First>40320</First>
    <Second>10080</Second>
    <Third>1440</Third>
    <Fourth>240</Fourth>
    <Fifth>120</Fifth>
  </AdvisorFrequencySettings>
  <RuleStore>
    <Rules>
      <Rule>
        <Description>Rule #2-a - Customer Management Center PCW+</Description>
        <Version>2</Version>
        <Enabled>true</Enabled>
        <GUID>f51363d6-294c-4b15-b02a-34fe8c0f1970</GUID>
        <Criteria xsi:type="AndExpression">
          <Description>Opens Customer list view, never been to CMC, PCW+</Description>
          <Version>2</Version>
          <IsVirtualRoot>false</IsVirtualRoot>
          <Key>09a73115-c5ca-4342-8069-545d9661d6f7</Key>
          <TemporalConstraints />
          <IsPassive>false</IsPassive>
          <Left xsi:type="InExpression">
            <Description />
            <Version>2</Version>
            <IsVirtualRoot>false</IsVirtualRoot>
            <Key>00000000-0000-0000-0000-000000000000</Key>
            <TemporalConstraints />
            <IsPassive>false</IsPassive>
            <Left xsi:type="QueryExpression">
              <Description />
              <Version>2</Version>
              <IsVirtualRoot>false</IsVirtualRoot>
              <Key>00000000-0000-0000-0000-000000000000</Key>
              <TemporalConstraints />
              <IsPassive>false</IsPassive>
              <Query>
```

```xml
      <Version>2</Version>
      <ActionDataHeader>
        <Classification>ApplicationDataAction</Classification>
        <Version>2</Version>
        <Id>00000000-0000-0000-0000-000000000000</Id>
        <IsExecutionVoter>false</IsExecutionVoter>
        <DependentUponId>00000000-0000-0000-0000-000000000000</DependentUponId>
        <DependentUponIdFailure>false</DependentUponIdFailure>
      </ActionDataHeader>
      <ApplicationData>
        <Version>2</Version>
        <Token>CompanyFlavor</Token>
        <Classification>ApplicationDataAction</Classification>
      </ApplicationData>
     </Query>
     <Parameters />
    </Left>
    <Right xsi:type="ConstantExpression">
     <Description />
     <Version>2</Version>
     <IsVirtualRoot>false</IsVirtualRoot>
     <Key>00000000-0000-0000-0000-000000000000</Key>
     <TemporalConstraints />
     <IsPassive>false</IsPassive>
     <Value xsi:type="ArrayOfAnyType">
       <anyType xsi:type="xsd:string">PCW</anyType>
       <anyType xsi:type="xsd:string">PPA</anyType>
       <anyType xsi:type="xsd:string">PPAA</anyType>
       <anyType xsi:type="xsd:string">PPAC</anyType>
       <anyType xsi:type="xsd:string">PPAD</anyType>
       <anyType xsi:type="xsd:string">PPAM</anyType>
       <anyType xsi:type="xsd:string">PPAN</anyType>
       <anyType xsi:type="xsd:string">PTX</anyType>
       <anyType xsi:type="xsd:string">PTXA</anyType>
     </Value>
    </Right>
   </Left>
   <Right xsi:type="AndExpression">
    <Description>User opens customer list view and has not been to the Customer Management tab.</Description>
    <Version>2</Version>
    <IsVirtualRoot>false</IsVirtualRoot>
    <Key>d085a700-0dc8-4fc8-b628-a09ef3479fba</Key>
    <TemporalConstraints />
    <IsPassive>false</IsPassive>
    <Left xsi:type="CreateWindowExpression">
      <Description>User opens the Customer List View</Description>
      <Version>2</Version>
      <IsVirtualRoot>false</IsVirtualRoot>
```

```xml
<Key>d17d18f3-de57-481b-878e-49599e9cec7e</Key>
<TemporalConstraints>
  <TemporalConstraint>
    <Version>2</Version>
    <Threshold>5</Threshold>
    <ThresholdOperator>GreaterThanOrEqual</ThresholdOperator>
    <TimeWindowSize>1</TimeWindowSize>
    <TimeWindowUnit>Month</TimeWindowUnit>
    <EraseHistory>true</EraseHistory>
  </TemporalConstraint>
</TemporalConstraints>
<IsPassive>false</IsPassive>
<WindowIdentifiers>
  <WindowIdentifier>
    <Version>2</Version>
    <HostWindowId>Customer List</HostWindowId>
    <ControlId />
    <HostWindowIdIsPattern>false</HostWindowIdIsPattern>
  </WindowIdentifier>
</WindowIdentifiers>
</Left>
<Right xsi:type="AndExpression">
<Description>Never been to customer management center.</Description>
<Version>2</Version>
<IsVirtualRoot>true</IsVirtualRoot>
<Key>240e3351-223f-4105-aac4-6c0174649986</Key>
<TemporalConstraints>
  <TemporalConstraint>
    <Version>2</Version>
    <Threshold>0</Threshold>
    <ThresholdOperator>LessThanOrEqual</ThresholdOperator>
    <TimeWindowSize>0</TimeWindowSize>
    <TimeWindowUnit>Day</TimeWindowUnit>
    <EraseHistory>false</EraseHistory>
  </TemporalConstraint>
</TemporalConstraints>
<IsPassive>false</IsPassive>
<Left xsi:type="WindowSignalExpression">
  <Description>Dashboard Panel Refresh event.</Description>
  <Version>2</Version>
  <IsVirtualRoot>false</IsVirtualRoot>
  <Key>a276a297-1cf9-4245-8efe-13d373bfe327</Key>
  <TemporalConstraints />
  <IsPassive>false</IsPassive>
  <WindowIdentifiers>
    <WindowIdentifier>
      <Version>2</Version>
      <HostWindowId>Product Main Window</HostWindowId>
      <ControlId />
```

```xml
      <HostWindowIdIsPattern>false</HostWindowIdIsPattern>
     </WindowIdentifier>
    </WindowIdentifiers>
    <SignalFilter>
     <Inclusions>
      <FilterItem>
       <Version>2</Version>
       <FilterCriteria>DashboardPanelRefresh</FilterCriteria>
      </FilterItem>
     </Inclusions>
     <Exclusions />
     <Version>2</Version>
    </SignalFilter>
    <VariableName>PanelId</VariableName>
   </Left>
   <Right xsi:type="EqualExpression">
    <Description>Was the dashboard panel refresh on the CMC</Description>
    <Version>2</Version>
    <IsVirtualRoot>false</IsVirtualRoot>
    <Key>117e651f-22a0-4cf4-a9ad-51074ebc73f3</Key>
    <TemporalConstraints />
    <IsPassive>false</IsPassive>
    <Left xsi:type="ValueOfExpression">
     <Description />
     <Version>2</Version>
     <IsVirtualRoot>false</IsVirtualRoot>
     <Key>ec8dd80b-976f-4d7a-a8e5-7630cf7ec449</Key>
     <TemporalConstraints />
     <IsPassive>false</IsPassive>
     <VariableName>PanelId</VariableName>
     <FieldIndex xsi:nil="true" />
     <FieldName />
     <ResultType xsi:nil="true" />
    </Left>
    <Right xsi:type="ConstantExpression">
     <Description />
     <Version>2</Version>
     <IsVirtualRoot>false</IsVirtualRoot>
     <Key>94830334-d121-4197-8e92-917a3b04d7e6</Key>
     <TemporalConstraints />
     <IsPassive>false</IsPassive>
     <Value xsi:type="xsd:string">Customer360</Value>
    </Right>
   </Right>
  </Right>
 </Right>
</Criteria>
<Actions>
 <ActionDataContainer>
```

```xml
<Version>2</Version>
<ActionDataHeader>
 <Classification>BubbleAction</Classification>
 <Version>2</Version>
 <Id>6d06b259-fd2a-4dd0-ba11-97d8f81e774a</Id>
 <IsExecutionVoter>true</IsExecutionVoter>
 <DependentUponId>00000000-0000-0000-0000-000000000000</DependentUponId>
 <DependentUponIdFailure>false</DependentUponIdFailure>
</ActionDataHeader>
<BubbleActionData>
 <Name>Quickly get the customer information you need</Name>
 <Description>Customer Management Center allows you to get detailed information about your customers at a glance.</Description>
 <Version>2</Version>
 <MessageID>3b7f77df-24fe-4d79-9e03-0dd810b9d082</MessageID>
 <MessagePath>customer_management_center.htm</MessagePath>
 <Height>192</Height>
 <Width>400</Width>
 <XParentOffset>-50</XParentOffset>
 <YParentOffset>0</YParentOffset>
 <ArrowCorner>None</ArrowCorner>
 <ShowAgain>false</ShowAgain>
 <MessageType>ProductivityTip</MessageType>
 <InitialDelay>0</InitialDelay>
 <WndID>
  <Version>2</Version>
  <HostWindowId />
  <ControlId />
  <HostWindowIdIsPattern>false</HostWindowIdIsPattern>
 </WndID>
</BubbleActionData>
</ActionDataContainer>
<ActionDataContainer>
 <Version>2</Version>
 <ActionDataHeader>
  <Classification>RuleModification</Classification>
  <Version>2</Version>
  <Id>90d5c2bb-b875-4281-9218-2aa2adcc94a5</Id>
  <IsExecutionVoter>true</IsExecutionVoter>
  <DependentUponId>6d06b259-fd2a-4dd0-ba11-97d8f81e774a</DependentUponId>
  <DependentUponIdFailure>false</DependentUponIdFailure>
 </ActionDataHeader>
 <ActionData>
  <Name>Rule Modification Action</Name>
  <Description>Enable the related PEP Tracking rule.</Description>
  <RuleMod>
   <TargetRuleGuid>2c968ef0-37ca-4902-bf1f-2b767bedb981</TargetRuleGuid>
   <PropertyMods>
    <PropertyMod>
```

```
            <PropertyName>Enabled</PropertyName>
            <PropertyValue>true</PropertyValue>
          </PropertyMod>
          <PropertyMod>
            <PropertyName>StartDate</PropertyName>
            <PropertyValue>now</PropertyValue>
          </PropertyMod>
          <PropertyMod>
            <PropertyName>EndDate</PropertyName>
            <PropertyValue>+30</PropertyValue>
          </PropertyMod>
        </PropertyMods>
      </RuleMod>
    </ActionData>
  </ActionDataContainer>
  <ActionDataContainer xsi:type="SignalActionDataContainer" signalType="ActionPassed">
    <Version>2</Version>
    <ActionDataHeader>
      <Classification>SignalAction</Classification>
      <Version>2</Version>
      <Id>6d26a7d9-ca62-4f23-84f5-50f25a79912b</Id>
      <IsExecutionVoter>true</IsExecutionVoter>
      <DependentUponId>6d06b259-fd2a-4dd0-ba11-97d8f81e774a</DependentUponId>
      <DependentUponIdFailure>false</DependentUponIdFailure>
    </ActionDataHeader>
  </ActionDataContainer>
  <ActionDataContainer xsi:type="SignalActionDataContainer" signalType="ActionFailed">
    <Version>2</Version>
    <ActionDataHeader>
      <Classification>SignalAction</Classification>
      <Version>2</Version>
      <Id>8a8a0918-67a3-434b-9529-2fc9066ae59d</Id>
      <IsExecutionVoter>false</IsExecutionVoter>
      <DependentUponId>6d06b259-fd2a-4dd0-ba11-97d8f81e774a</DependentUponId>
      <DependentUponIdFailure>true</DependentUponIdFailure>
    </ActionDataHeader>
  </ActionDataContainer>
</Actions>
<MetaDataFields />
<Signature>pXzSEhuvJL+ideVuWBhjwYdkYc5U1GDLiujZO6aUTwcLYD1WQOVdWA==</Signature>
  <StartDate xsi:nil="true" />
  <EndDate xsi:nil="true" />
</Rule>
```

Example 3:

```
<Rule>
    <Description>Rule #3 - Click the View Related Transactions link on any transaction to find related transactions.</Description>
    <Version>2</Version>
    <Enabled>true</Enabled>
    <GUID>5346d477-dc97-4499-a4a5-0c25c8caca22</GUID>
    <Criteria xsi:type="AndExpression">
     <Description />
     <Version>2</Version>
     <IsVirtualRoot>false</IsVirtualRoot>
     <Key>00000000-0000-0000-0000-000000000000</Key>
     <TemporalConstraints />
     <IsPassive>false</IsPassive>
     <Left xsi:type="CreateWindowExpression">
      <Description />
      <Version>2</Version>
      <IsVirtualRoot>false</IsVirtualRoot>
      <Key>25aa178d-55f9-42b5-b56f-f162eb956f8e</Key>
      <TemporalConstraints>
        <TemporalConstraint>
          <Version>2</Version>
          <Threshold>2</Threshold>
          <ThresholdOperator>GreaterThanOrEqual</ThresholdOperator>
          <TimeWindowSize>1</TimeWindowSize>
          <TimeWindowUnit>Month</TimeWindowUnit>
          <EraseHistory>true</EraseHistory>
        </TemporalConstraint>
      </TemporalConstraints>
      <IsPassive>false</IsPassive>
      <WindowIdentifiers>
        <WindowIdentifier>
          <Version>2</Version>
          <HostWindowId>Source| 0,Destination| 0,Report Type| ARview15,Report View| 86,Report Group| 1,Report Name| Customer Transaction History</HostWindowId>
          <ControlId />
          <HostWindowIdIsPattern>false</HostWindowIdIsPattern>
        </WindowIdentifier>
      </WindowIdentifiers>
     </Left>
     <Right xsi:type="CreateWindowExpression">
      <Description />
      <Version>2</Version>
      <IsVirtualRoot>false</IsVirtualRoot>
      <Key>06fdfb6d-25a3-403e-9f87-0aaec2703649</Key>
      <TemporalConstraints>
        <TemporalConstraint>
          <Version>2</Version>
```

```xml
  <Threshold>0</Threshold>
  <ThresholdOperator>LessThanOrEqual</ThresholdOperator>
  <TimeWindowSize>0</TimeWindowSize>
  <TimeWindowUnit>Day</TimeWindowUnit>
  <EraseHistory>false</EraseHistory>
 </TemporalConstraint>
</TemporalConstraints>
<IsPassive>true</IsPassive>
<WindowIdentifiers>
 <WindowIdentifier>
  <Version>2</Version>
  <HostWindowId>Related to Invoice</HostWindowId>
  <ControlId />
  <HostWindowIdIsPattern>false</HostWindowIdIsPattern>
 </WindowIdentifier>
 <WindowIdentifier>
  <Version>2</Version>
  <HostWindowId>Related to Sales Order</HostWindowId>
  <ControlId />
  <HostWindowIdIsPattern>false</HostWindowIdIsPattern>
 </WindowIdentifier>
 <WindowIdentifier>
  <Version>2</Version>
  <HostWindowId>Related to Proposal</HostWindowId>
  <ControlId />
  <HostWindowIdIsPattern>false</HostWindowIdIsPattern>
 </WindowIdentifier>
 <WindowIdentifier>
  <Version>2</Version>
  <HostWindowId>Related to Credit Memo</HostWindowId>
  <ControlId />
  <HostWindowIdIsPattern>false</HostWindowIdIsPattern>
 </WindowIdentifier>
 <WindowIdentifier>
  <Version>2</Version>
  <HostWindowId>Related to Purchase Order</HostWindowId>
  <ControlId />
  <HostWindowIdIsPattern>false</HostWindowIdIsPattern>
 </WindowIdentifier>
 <WindowIdentifier>
  <Version>2</Version>
  <HostWindowId>Related to Quote</HostWindowId>
  <ControlId />
  <HostWindowIdIsPattern>false</HostWindowIdIsPattern>
 </WindowIdentifier>
 <WindowIdentifier>
  <Version>2</Version>
  <HostWindowId>Related to Purchase</HostWindowId>
  <ControlId />
```

```xml
      <HostWindowIdIsPattern>false</HostWindowIdIsPattern>
    </WindowIdentifier>
    <WindowIdentifier>
      <Version>2</Version>
      <HostWindowId>Related to Vendor Credit</HostWindowId>
      <ControlId />
      <HostWindowIdIsPattern>false</HostWindowIdIsPattern>
    </WindowIdentifier>
   </WindowIdentifiers>
  </Right>
 </Criteria>
 <Actions>
  <ActionDataContainer>
   <Version>2</Version>
   <ActionDataHeader>
    <Classification>BubbleAction</Classification>
    <Version>2</Version>
    <Id>5b790bc3-397d-4ee3-90ca-c4a94562bc9f</Id>
    <IsExecutionVoter>true</IsExecutionVoter>
    <DependentUponId>00000000-0000-0000-0000-000000000000</DependentUponId>
    <DependentUponIdFailure>false</DependentUponIdFailure>
   </ActionDataHeader>
   <BubbleActionData>
    <Name>Need to know if a purchase order was ...</Name>
    <Description>Click the View Related Transactions link on any transaction to find related transactions.</Description>
    <Version>2</Version>
    <MessageID>6376bd53-0a4d-4d15-9be3-0e920e48235e</MessageID>
    <MessagePath>Related_transactions.htm</MessagePath>
    <Height>214</Height>
    <Width>400</Width>
    <XParentOffset>-50</XParentOffset>
    <YParentOffset>0</YParentOffset>
    <ArrowCorner>None</ArrowCorner>
    <ShowAgain>false</ShowAgain>
    <MessageType>ProductivityTip</MessageType>
    <InitialDelay>0</InitialDelay>
    <WndID>
     <Version>2</Version>
     <HostWindowId />
     <ControlId />
     <HostWindowIdIsPattern>false</HostWindowIdIsPattern>
    </WndID>
   </BubbleActionData>
  </ActionDataContainer>
  <ActionDataContainer>
   <Version>2</Version>
   <ActionDataHeader>
    <Classification>RuleModification</Classification>
```

```xml
        <Version>2</Version>
        <Id>5594aa1b-1ed5-41f4-aa59-0c5caf22a86a</Id>
        <IsExecutionVoter>true</IsExecutionVoter>
        <DependentUponId>5b790bc3-397d-4ee3-90ca-c4a94562bc9f</DependentUponId>
        <DependentUponIdFailure>false</DependentUponIdFailure>
      </ActionDataHeader>
      <ActionData>
        <Name>Rule Modification Action</Name>
        <Description>Enable the related PEP Tracking rule.</Description>
        <RuleMod>
          <TargetRuleGuid>948646bc-b8eb-4af0-a3c6-8428c2e7f771</TargetRuleGuid>
          <PropertyMods>
            <PropertyMod>
              <PropertyName>Enabled</PropertyName>
              <PropertyValue>true</PropertyValue>
            </PropertyMod>
            <PropertyMod>
              <PropertyName>StartDate</PropertyName>
              <PropertyValue>now</PropertyValue>
            </PropertyMod>
            <PropertyMod>
              <PropertyName>EndDate</PropertyName>
              <PropertyValue>+30</PropertyValue>
            </PropertyMod>
          </PropertyMods>
        </RuleMod>
      </ActionData>
    </ActionDataContainer>
    <ActionDataContainer xsi:type="SignalActionDataContainer" signalType="ActionPassed">
      <Version>2</Version>
      <ActionDataHeader>
        <Classification>SignalAction</Classification>
        <Version>2</Version>
        <Id>85a2d3c1-c853-4ff3-9b78-8a092612a212</Id>
        <IsExecutionVoter>true</IsExecutionVoter>
        <DependentUponId>5b790bc3-397d-4ee3-90ca-c4a94562bc9f</DependentUponId>
        <DependentUponIdFailure>false</DependentUponIdFailure>
      </ActionDataHeader>
    </ActionDataContainer>
    <ActionDataContainer xsi:type="SignalActionDataContainer" signalType="ActionFailed">
      <Version>2</Version>
      <ActionDataHeader>
        <Classification>SignalAction</Classification>
        <Version>2</Version>
        <Id>785c99bb-4bf6-47f8-b98a-233bb352d09c</Id>
        <IsExecutionVoter>false</IsExecutionVoter>
        <DependentUponId>5b790bc3-397d-4ee3-90ca-c4a94562bc9f</DependentUponId>
```

```
        <DependentUponIdFailure>true</DependentUponIdFailure>
      </ActionDataHeader>
     </ActionDataContainer>
  </Actions>
  <MetaDataFields />
<Signature>XzXiTjR6vk0XA9L4I+ml16+NFixju3hnBI4nVDFaty0kzWe32DruJA==</Signature>
  <StartDate xsi:nil="true" />
  <EndDate xsi:nil="true" />
</Rule>
```

Example 4:

```
<Rule>
  <Description>Rule #4 - Automatically reconcile bank statements.</Description>
  <Version>2</Version>
  <Enabled>true</Enabled>
  <GUID>302126c2-777a-4c3b-bd2d-c97c28f017ac</GUID>
  <Criteria xsi:type="AndExpression">
   <Description />
   <Version>2</Version>
   <IsVirtualRoot>false</IsVirtualRoot>
   <Key>00000000-0000-0000-0000-000000000000</Key>
   <TemporalConstraints />
   <IsPassive>false</IsPassive>
   <Left xsi:type="AndExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Left xsi:type="ControlValueChangedExpression">
     <Description />
     <Version>2</Version>
     <IsVirtualRoot>false</IsVirtualRoot>
     <Key>00000000-0000-0000-0000-000000000000</Key>
     <TemporalConstraints />
     <IsPassive>false</IsPassive>
     <WindowIdentifiers>
      <WindowIdentifier>
       <Version>2</Version>
       <HostWindowId>Account Reconciliation</HostWindowId>
       <ControlId>1011</ControlId>
       <HostWindowIdIsPattern>false</HostWindowIdIsPattern>
      </WindowIdentifier>
     </WindowIdentifiers>
    </Left>
```

```xml
<Right xsi:type="CreateWindowExpression">
 <Description />
 <Version>2</Version>
 <IsVirtualRoot>false</IsVirtualRoot>
 <Key>be543258-5eef-4bdd-82b1-0df5f2944a17</Key>
 <TemporalConstraints>
  <TemporalConstraint>
   <Version>2</Version>
   <Threshold>0</Threshold>
   <ThresholdOperator>LessThanOrEqual</ThresholdOperator>
   <TimeWindowSize>0</TimeWindowSize>
   <TimeWindowUnit>Day</TimeWindowUnit>
   <EraseHistory>false</EraseHistory>
  </TemporalConstraint>
 </TemporalConstraints>
 <IsPassive>true</IsPassive>
 <WindowIdentifiers>
  <WindowIdentifier>
   <Version>2</Version>
   <HostWindowId>Import Statement</HostWindowId>
   <ControlId />
   <HostWindowIdIsPattern>false</HostWindowIdIsPattern>
  </WindowIdentifier>
 </WindowIdentifiers>
</Right>
</Left>
<Right xsi:type="OrExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Left xsi:type="OrExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Left xsi:type="OrExpression">
   <Description />
   <Version>2</Version>
   <IsVirtualRoot>false</IsVirtualRoot>
   <Key>00000000-0000-0000-0000-000000000000</Key>
   <TemporalConstraints />
   <IsPassive>false</IsPassive>
   <Left xsi:type="OrExpression">
    <Description />
```

```xml
<Version>2</Version>
<IsVirtualRoot>false</IsVirtualRoot>
<Key>00000000-0000-0000-0000-000000000000</Key>
<TemporalConstraints />
<IsPassive>false</IsPassive>
<Left xsi:type="EqualExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Left xsi:type="QueryExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Query>
      <Version>2</Version>
      <ActionDataHeader>
        <Classification>ApplicationDataAction</Classification>
        <Version>2</Version>
        <Id>00000000-0000-0000-0000-000000000000</Id>
        <IsExecutionVoter>false</IsExecutionVoter>
        <DependentUponId>00000000-0000-0000-0000-000000000000</DependentUponId>
        <DependentUponIdFailure>false</DependentUponIdFailure>
      </ActionDataHeader>
      <ApplicationData>
        <Version>2</Version>
        <Token>CompanyFlavor</Token>
        <Classification>ApplicationDataAction</Classification>
      </ApplicationData>
    </Query>
    <Parameters />
  </Left>
  <Right xsi:type="ConstantExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Value xsi:type="xsd:string">PTX</Value>
  </Right>
</Left>
<Right xsi:type="EqualExpression">
```

```xml
        <Description />
        <Version>2</Version>
        <IsVirtualRoot>false</IsVirtualRoot>
        <Key>00000000-0000-0000-0000-000000000000</Key>
        <TemporalConstraints />
        <IsPassive>false</IsPassive>
        <Left xsi:type="QueryExpression">
          <Description />
          <Version>2</Version>
          <IsVirtualRoot>false</IsVirtualRoot>
          <Key>00000000-0000-0000-0000-000000000000</Key>
          <TemporalConstraints />
          <IsPassive>false</IsPassive>
          <Query>
            <Version>2</Version>
            <ActionDataHeader>
              <Classification>ApplicationDataAction</Classification>
              <Version>2</Version>
              <Id>00000000-0000-0000-0000-000000000000</Id>
              <IsExecutionVoter>false</IsExecutionVoter>
              <DependentUponId>00000000-0000-0000-0000-000000000000</DependentUponId>
              <DependentUponIdFailure>false</DependentUponIdFailure>
            </ActionDataHeader>
            <ApplicationData>
              <Version>2</Version>
              <Token>CompanyFlavor</Token>
              <Classification>ApplicationDataAction</Classification>
            </ApplicationData>
          </Query>
          <Parameters />
        </Left>
        <Right xsi:type="ConstantExpression">
          <Description />
          <Version>2</Version>
          <IsVirtualRoot>false</IsVirtualRoot>
          <Key>00000000-0000-0000-0000-000000000000</Key>
          <TemporalConstraints />
          <IsPassive>false</IsPassive>
          <Value xsi:type="xsd:string">PTXA</Value>
        </Right>
      </Right>
    </Left>
    <Right xsi:type="OrExpression">
      <Description />
      <Version>2</Version>
      <IsVirtualRoot>false</IsVirtualRoot>
      <Key>00000000-0000-0000-0000-000000000000</Key>
      <TemporalConstraints />
```

```xml
<IsPassive>false</IsPassive>
<Left xsi:type="EqualExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Left xsi:type="QueryExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Query>
      <Version>2</Version>
      <ActionDataHeader>
        <Classification>ApplicationDataAction</Classification>
        <Version>2</Version>
        <Id>00000000-0000-0000-0000-000000000000</Id>
        <IsExecutionVoter>false</IsExecutionVoter>
        <DependentUponId>00000000-0000-0000-0000-000000000000</DependentUponId>
        <DependentUponIdFailure>false</DependentUponIdFailure>
      </ActionDataHeader>
      <ApplicationData>
        <Version>2</Version>
        <Token>CompanyFlavor</Token>
        <Classification>ApplicationDataAction</Classification>
      </ApplicationData>
    </Query>
    <Parameters />
  </Left>
  <Right xsi:type="ConstantExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Value xsi:type="xsd:string">PCW</Value>
  </Right>
</Left>
<Right xsi:type="EqualExpression">
  <Description />
  <Version>2</Version>
  <IsVirtualRoot>false</IsVirtualRoot>
  <Key>00000000-0000-0000-0000-000000000000</Key>
```

```xml
            <TemporalConstraints />
            <IsPassive>false</IsPassive>
            <Left xsi:type="QueryExpression">
              <Description />
              <Version>2</Version>
              <IsVirtualRoot>false</IsVirtualRoot>
              <Key>00000000-0000-0000-0000-000000000000</Key>
              <TemporalConstraints />
              <IsPassive>false</IsPassive>
              <Query>
                <Version>2</Version>
                <ActionDataHeader>
                  <Classification>ApplicationDataAction</Classification>
                  <Version>2</Version>
                  <Id>00000000-0000-0000-0000-000000000000</Id>
                  <IsExecutionVoter>false</IsExecutionVoter>
                  <DependentUponId>00000000-0000-0000-0000-000000000000</DependentUponId>
                  <DependentUponIdFailure>false</DependentUponIdFailure>
                </ActionDataHeader>
                <ApplicationData>
                  <Version>2</Version>
                  <Token>CompanyFlavor</Token>
                  <Classification>ApplicationDataAction</Classification>
                </ApplicationData>
              </Query>
              <Parameters />
            </Left>
            <Right xsi:type="ConstantExpression">
              <Description />
              <Version>2</Version>
              <IsVirtualRoot>false</IsVirtualRoot>
              <Key>00000000-0000-0000-0000-000000000000</Key>
              <TemporalConstraints />
              <IsPassive>false</IsPassive>
              <Value xsi:type="xsd:string">PPA</Value>
            </Right>
          </Right>
        </Right>
      </Left>
      <Right xsi:type="EqualExpression">
        <Description />
        <Version>2</Version>
        <IsVirtualRoot>false</IsVirtualRoot>
        <Key>00000000-0000-0000-0000-000000000000</Key>
        <TemporalConstraints />
        <IsPassive>false</IsPassive>
        <Left xsi:type="QueryExpression">
          <Description />
```

```xml
            <Version>2</Version>
            <IsVirtualRoot>false</IsVirtualRoot>
            <Key>00000000-0000-0000-0000-000000000000</Key>
            <TemporalConstraints />
            <IsPassive>false</IsPassive>
            <Query>
              <Version>2</Version>
              <ActionDataHeader>
                <Classification>ApplicationDataAction</Classification>
                <Version>2</Version>
                <Id>00000000-0000-0000-0000-000000000000</Id>
                <IsExecutionVoter>false</IsExecutionVoter>
                <DependentUponId>00000000-0000-0000-0000-000000000000</DependentUponId>
                <DependentUponIdFailure>false</DependentUponIdFailure>
              </ActionDataHeader>
              <ApplicationData>
                <Version>2</Version>
                <Token>CompanyFlavor</Token>
                <Classification>ApplicationDataAction</Classification>
              </ApplicationData>
            </Query>
            <Parameters />
          </Left>
          <Right xsi:type="ConstantExpression">
            <Description />
            <Version>2</Version>
            <IsVirtualRoot>false</IsVirtualRoot>
            <Key>00000000-0000-0000-0000-000000000000</Key>
            <TemporalConstraints />
            <IsPassive>false</IsPassive>
            <Value xsi:type="xsd:string">PPAA</Value>
          </Right>
        </Right>
      </Left>
      <Right xsi:type="OrExpression">
        <Description />
        <Version>2</Version>
        <IsVirtualRoot>false</IsVirtualRoot>
        <Key>00000000-0000-0000-0000-000000000000</Key>
        <TemporalConstraints />
        <IsPassive>false</IsPassive>
        <Left xsi:type="OrExpression">
          <Description />
          <Version>2</Version>
          <IsVirtualRoot>false</IsVirtualRoot>
          <Key>00000000-0000-0000-0000-000000000000</Key>
          <TemporalConstraints />
          <IsPassive>false</IsPassive>
```

```xml
<Left xsi:type="EqualExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Left xsi:type="QueryExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Query>
      <Version>2</Version>
      <ActionDataHeader>
        <Classification>ApplicationDataAction</Classification>
        <Version>2</Version>
        <Id>00000000-0000-0000-0000-000000000000</Id>
        <IsExecutionVoter>false</IsExecutionVoter>
        <DependentUponId>00000000-0000-0000-0000-000000000000</DependentUponId>
        <DependentUponIdFailure>false</DependentUponIdFailure>
      </ActionDataHeader>
      <ApplicationData>
        <Version>2</Version>
        <Token>CompanyFlavor</Token>
        <Classification>ApplicationDataAction</Classification>
      </ApplicationData>
    </Query>
    <Parameters />
  </Left>
  <Right xsi:type="ConstantExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Value xsi:type="xsd:string">PPAN</Value>
  </Right>
</Left>
<Right xsi:type="EqualExpression">
  <Description />
  <Version>2</Version>
  <IsVirtualRoot>false</IsVirtualRoot>
  <Key>00000000-0000-0000-0000-000000000000</Key>
  <TemporalConstraints />
```

```xml
            <IsPassive>false</IsPassive>
            <Left xsi:type="QueryExpression">
              <Description />
              <Version>2</Version>
              <IsVirtualRoot>false</IsVirtualRoot>
              <Key>00000000-0000-0000-0000-000000000000</Key>
              <TemporalConstraints />
              <IsPassive>false</IsPassive>
              <Query>
                <Version>2</Version>
                <ActionDataHeader>
                  <Classification>ApplicationDataAction</Classification>
                  <Version>2</Version>
                  <Id>00000000-0000-0000-0000-000000000000</Id>
                  <IsExecutionVoter>false</IsExecutionVoter>
                  <DependentUponId>00000000-0000-0000-0000-000000000000</DependentUponId>
                  <DependentUponIdFailure>false</DependentUponIdFailure>
                </ActionDataHeader>
                <ApplicationData>
                  <Version>2</Version>
                  <Token>CompanyFlavor</Token>
                  <Classification>ApplicationDataAction</Classification>
                </ApplicationData>
              </Query>
              <Parameters />
            </Left>
            <Right xsi:type="ConstantExpression">
              <Description />
              <Version>2</Version>
              <IsVirtualRoot>false</IsVirtualRoot>
              <Key>00000000-0000-0000-0000-000000000000</Key>
              <TemporalConstraints />
              <IsPassive>false</IsPassive>
              <Value xsi:type="xsd:string">PPAM</Value>
            </Right>
          </Right>
        </Left>
        <Right xsi:type="OrExpression">
          <Description />
          <Version>2</Version>
          <IsVirtualRoot>false</IsVirtualRoot>
          <Key>00000000-0000-0000-0000-000000000000</Key>
          <TemporalConstraints />
          <IsPassive>false</IsPassive>
          <Left xsi:type="EqualExpression">
            <Description />
            <Version>2</Version>
            <IsVirtualRoot>false</IsVirtualRoot>
```

```xml
<Key>00000000-0000-0000-0000-000000000000</Key>
<TemporalConstraints />
<IsPassive>false</IsPassive>
<Left xsi:type="QueryExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Query>
  <Version>2</Version>
  <ActionDataHeader>
   <Classification>ApplicationDataAction</Classification>
   <Version>2</Version>
   <Id>00000000-0000-0000-0000-000000000000</Id>
   <IsExecutionVoter>false</IsExecutionVoter>
   <DependentUponId>00000000-0000-0000-0000-000000000000</DependentUponId>
   <DependentUponIdFailure>false</DependentUponIdFailure>
  </ActionDataHeader>
  <ApplicationData>
   <Version>2</Version>
   <Token>CompanyFlavor</Token>
   <Classification>ApplicationDataAction</Classification>
  </ApplicationData>
 </Query>
 <Parameters />
</Left>
<Right xsi:type="ConstantExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Value xsi:type="xsd:string">PPAD</Value>
</Right>
</Left>
<Right xsi:type="EqualExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Left xsi:type="QueryExpression">
  <Description />
  <Version>2</Version>
```

```xml
            <IsVirtualRoot>false</IsVirtualRoot>
            <Key>00000000-0000-0000-0000-000000000000</Key>
            <TemporalConstraints />
            <IsPassive>false</IsPassive>
            <Query>
              <Version>2</Version>
              <ActionDataHeader>
                <Classification>ApplicationDataAction</Classification>
                <Version>2</Version>
                <Id>00000000-0000-0000-0000-000000000000</Id>
                <IsExecutionVoter>false</IsExecutionVoter>
                <DependentUponId>00000000-0000-0000-0000-000000000000</DependentUponId>
                <DependentUponIdFailure>false</DependentUponIdFailure>
              </ActionDataHeader>
              <ApplicationData>
                <Version>2</Version>
                <Token>CompanyFlavor</Token>
                <Classification>ApplicationDataAction</Classification>
              </ApplicationData>
            </Query>
            <Parameters />
          </Left>
          <Right xsi:type="ConstantExpression">
            <Description />
            <Version>2</Version>
            <IsVirtualRoot>false</IsVirtualRoot>
            <Key>00000000-0000-0000-0000-000000000000</Key>
            <TemporalConstraints />
            <IsPassive>false</IsPassive>
            <Value xsi:type="xsd:string">PPAC</Value>
          </Right>
        </Right>
       </Right>
      </Right>
     </Right>
  </Criteria>
  <Actions>
    <ActionDataContainer>
     <Version>2</Version>
     <ActionDataHeader>
       <Classification>BubbleAction</Classification>
       <Version>2</Version>
       <Id>77d53a1b-a88d-493b-a98d-11b819293e3e</Id>
       <IsExecutionVoter>true</IsExecutionVoter>
       <DependentUponId>00000000-0000-0000-0000-000000000000</DependentUponId>
       <DependentUponIdFailure>false</DependentUponIdFailure>
     </ActionDataHeader>
     <BubbleActionData>
```

```xml
        <Name>Automatically reconcile bank statements</Name>
        <Description>Save time and reduce errors by importing your online bank
statement</Description>
        <Version>2</Version>
        <MessageID>ff51af19-f732-46ca-8c01-c6c5375631c4</MessageID>
        <MessagePath>Import_bank_statement.htm</MessagePath>
        <Height>180</Height>
        <Width>400</Width>
        <XParentOffset>205</XParentOffset>
        <YParentOffset>-28</YParentOffset>
        <ArrowCorner>TopLeft</ArrowCorner>
        <ShowAgain>false</ShowAgain>
        <MessageType>ProductivityTip</MessageType>
        <InitialDelay>0</InitialDelay>
        <WndID>
          <Version>2</Version>
          <HostWindowId />
          <ControlId />
          <HostWindowIdIsPattern>false</HostWindowIdIsPattern>
        </WndID>
      </BubbleActionData>
    </ActionDataContainer>
    <ActionDataContainer>
      <Version>2</Version>
      <ActionDataHeader>
        <Classification>RuleModification</Classification>
        <Version>2</Version>
        <Id>62ce0002-7f17-4871-8688-7e739ff56b3f</Id>
        <IsExecutionVoter>true</IsExecutionVoter>
        <DependentUponId>77d53a1b-a88d-493b-a98d-11b819293e3e</DependentUponId>
        <DependentUponIdFailure>false</DependentUponIdFailure>
      </ActionDataHeader>
      <ActionData>
        <Name>Rule Modification Action</Name>
        <Description>Enable the related PEP Tracking rule.</Description>
        <RuleMod>
          <TargetRuleGuid>8a3a517b-3d73-48f7-90f5-ccc337c277ed</TargetRuleGuid>
          <PropertyMods>
            <PropertyMod>
              <PropertyName>Enabled</PropertyName>
              <PropertyValue>true</PropertyValue>
            </PropertyMod>
            <PropertyMod>
              <PropertyName>StartDate</PropertyName>
              <PropertyValue>now</PropertyValue>
            </PropertyMod>
            <PropertyMod>
              <PropertyName>EndDate</PropertyName>
              <PropertyValue>+90</PropertyValue>
```

```
            </PropertyMod>
          </PropertyMods>
        </RuleMod>
      </ActionData>
    </ActionDataContainer>
    <ActionDataContainer xsi:type="SignalActionDataContainer"
signalType="ActionPassed">
      <Version>2</Version>
      <ActionDataHeader>
        <Classification>SignalAction</Classification>
        <Version>2</Version>
        <Id>1d4f1f3c-66a7-4591-8cf0-d5479c322b30</Id>
        <IsExecutionVoter>true</IsExecutionVoter>
        <DependentUponId>77d53a1b-a88d-493b-a98d-11b819293e3e</DependentUponId>
        <DependentUponIdFailure>false</DependentUponIdFailure>
      </ActionDataHeader>
    </ActionDataContainer>
    <ActionDataContainer xsi:type="SignalActionDataContainer"
signalType="ActionFailed">
      <Version>2</Version>
      <ActionDataHeader>
        <Classification>SignalAction</Classification>
        <Version>2</Version>
        <Id>24f3024a-fc13-47fb-be41-331d3cac792f</Id>
        <IsExecutionVoter>false</IsExecutionVoter>
        <DependentUponId>77d53a1b-a88d-493b-a98d-11b819293e3e</DependentUponId>
        <DependentUponIdFailure>true</DependentUponIdFailure>
      </ActionDataHeader>
    </ActionDataContainer>
  </Actions>
  <MetaDataFields />

<Signature>d13EO51T0TDskt8rsZ2nkRNQmDUfMC1lTEzL/SRtODhaEZ135wz/1A==</Signature>
    <StartDate xsi:nil="true" />
    <EndDate xsi:nil="true" />
  </Rule>

Example 5:
  <Rule>
    <Description>Rule #5 - Find out how to write off customer balances in
Product.</Description>
    <Version>2</Version>
    <Enabled>true</Enabled>
    <GUID>00334bb6-04b2-4e62-8ecb-4f50a59f76d0</GUID>
    <Criteria xsi:type="AndExpression">
      <Description />
      <Version>2</Version>
```

```xml
<IsVirtualRoot>false</IsVirtualRoot>
<Key>00000000-0000-0000-0000-000000000000</Key>
<TemporalConstraints />
<IsPassive>false</IsPassive>
<Left xsi:type="AndExpression">
  <Description />
  <Version>2</Version>
  <IsVirtualRoot>false</IsVirtualRoot>
  <Key>dfd6ce05-f704-4fe9-8fb4-5b2029adddbd</Key>
  <TemporalConstraints>
    <TemporalConstraint>
      <Version>2</Version>
      <Threshold>2</Threshold>
      <ThresholdOperator>GreaterThanOrEqual</ThresholdOperator>
      <TimeWindowSize>1</TimeWindowSize>
      <TimeWindowUnit>Day</TimeWindowUnit>
      <EraseHistory>true</EraseHistory>
    </TemporalConstraint>
  </TemporalConstraints>
  <IsPassive>false</IsPassive>
  <Left xsi:type="CreateWindowExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <WindowIdentifiers>
      <WindowIdentifier>
        <Version>2</Version>
        <HostWindowId>Source| 0,Destination| 0,Report Type| ARview3,Report View| 3,Report Group| 0,Report Name| Aged Receivables</HostWindowId>
        <ControlId />
        <HostWindowIdIsPattern>false</HostWindowIdIsPattern>
      </WindowIdentifier>
    </WindowIdentifiers>
  </Left>
  <Right xsi:type="GTEExpression">
    <Description />
    <Version>2</Version>
    <IsVirtualRoot>false</IsVirtualRoot>
    <Key>00000000-0000-0000-0000-000000000000</Key>
    <TemporalConstraints />
    <IsPassive>false</IsPassive>
    <Left xsi:type="QueryExpression">
      <Description />
      <Version>2</Version>
      <IsVirtualRoot>false</IsVirtualRoot>
      <Key>00000000-0000-0000-0000-000000000000</Key>
```

```xml
<TemporalConstraints />
<IsPassive>false</IsPassive>
<Query>
 <Version>2</Version>
 <ActionDataHeader>
  <Classification>ProductSQLAction</Classification>
  <Version>2</Version>
  <Id>00000000-0000-0000-0000-000000000000</Id>
  <IsExecutionVoter>false</IsExecutionVoter>
  <DependentUponId>00000000-0000-0000-0000-000000000000</DependentUponId>
  <DependentUponIdFailure>false</DependentUponIdFailure>
 </ActionDataHeader>
 <ProductSQLData>
  <Description>Get the count of registers where last aging bracket have status of Unpaid.</Description>
  <SQL>
   SELECT COUNT(*)     FROM JrnlHdr
   WHERE JournalEx IN (8,9,10) and
   ((DateDue IS NULL)
   OR (DateDue < DATEADD(DAY, (SELECT (NUMDAysinbracket2 * (-1)) FROM GENERAL_AR WHERE ACCTgmodule = 1), CAST(? AS DATE)))) and
   AmountPaid = 0 and
   trxisposted = 1 and
   (   CompletedDate is null OR
   CompletedDate > ? OR
   TransactionDate > ? )
  </SQL>
  <ConnectionName>DEFAULT</ConnectionName>
  <SqlType>Scalar</SqlType>
  <ParameterTokens>
   <string>AsOfDate</string>
   <string>AsOfDate</string>
   <string>AsOfDate</string>
  </ParameterTokens>
  <Classification>ProductSQLAction</Classification>
 </ProductSQLData>
</Query>
<Parameters />
</Left>
<Right xsi:type="ConstantExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Value xsi:type="xsd:int">1</Value>
</Right>
```

```xml
</Right>
</Left>
<Right xsi:type="EqualExpression">
 <Description />
 <Version>2</Version>
 <IsVirtualRoot>false</IsVirtualRoot>
 <Key>00000000-0000-0000-0000-000000000000</Key>
 <TemporalConstraints />
 <IsPassive>false</IsPassive>
 <Left xsi:type="QueryExpression">
  <Description />
  <Version>2</Version>
  <IsVirtualRoot>false</IsVirtualRoot>
  <Key>00000000-0000-0000-0000-000000000000</Key>
  <TemporalConstraints />
  <IsPassive>false</IsPassive>
  <Query>
   <Version>2</Version>
   <ActionDataHeader>
    <Classification>ProductSQLAction</Classification>
    <Version>2</Version>
    <Id>00000000-0000-0000-0000-000000000000</Id>
    <IsExecutionVoter>false</IsExecutionVoter>
    <DependentUponId>00000000-0000-0000-0000-000000000000</DependentUponId>
    <DependentUponIdFailure>false</DependentUponIdFailure>
   </ActionDataHeader>
   <ProductSQLData>
    <Description>Get the count of registers where receipts have a reference of WO</Description>
    <SQL>
     SELECT COUNT(*) FROM JrnlHdr
     WHERE JournalEx IN (3, 4) AND
     Module IN ('P', 'R') AND
     JrnlKey_Partner = 0 AND
     JrnlKey_Shadow = 0 AND
     IsBegBal = 0 AND
     Reference LIKE '%WO%'
    </SQL>
    <ConnectionName>DEFAULT</ConnectionName>
    <SqlType>Scalar</SqlType>
    <ParameterTokens />
    <Classification>ProductSQLAction</Classification>
   </ProductSQLData>
  </Query>
  <Parameters />
 </Left>
 <Right xsi:type="ConstantExpression">
  <Description />
  <Version>2</Version>
```

```xml
      <IsVirtualRoot>false</IsVirtualRoot>
      <Key>00000000-0000-0000-0000-000000000000</Key>
      <TemporalConstraints />
      <IsPassive>false</IsPassive>
      <Value xsi:type="xsd:int">0</Value>
    </Right>
  </Right>
</Criteria>
<Actions>
  <ActionDataContainer>
    <Version>2</Version>
    <ActionDataHeader>
      <Classification>BubbleAction</Classification>
      <Version>2</Version>
      <Id>cd7212a4-5fbd-417a-a740-ca46381f8fec</Id>
      <IsExecutionVoter>true</IsExecutionVoter>
      <DependentUponId>00000000-0000-0000-0000-000000000000</DependentUponId>
      <DependentUponIdFailure>false</DependentUponIdFailure>
    </ActionDataHeader>
    <BubbleActionData>
      <Name>Need to write off unpaid invoices?</Name>
      <Description>If you know that a customer is not going to pay you</Description>
      <Version>2</Version>
      <MessageID>ac91f3bd-1b30-415a-83fa-131c9fa23ba0</MessageID>
      <MessagePath>Write_off_bad_debt.htm</MessagePath>
      <Height>210</Height>
      <Width>400</Width>
      <XParentOffset>-50</XParentOffset>
      <YParentOffset>0</YParentOffset>
      <ArrowCorner>None</ArrowCorner>
      <ShowAgain>false</ShowAgain>
      <MessageType>ProductivityTip</MessageType>
      <InitialDelay>0</InitialDelay>
      <WndID>
        <Version>2</Version>
        <HostWindowId />
        <ControlId />
        <HostWindowIdIsPattern>false</HostWindowIdIsPattern>
      </WndID>
    </BubbleActionData>
  </ActionDataContainer>
  <ActionDataContainer>
    <Version>2</Version>
    <ActionDataHeader>
      <Classification>RuleModification</Classification>
      <Version>2</Version>
      <Id>b1691f64-3a3f-4d65-87bc-cb3c22e9097e</Id>
      <IsExecutionVoter>true</IsExecutionVoter>
      <DependentUponId>cd7212a4-5fbd-417a-a740-ca46381f8fec</DependentUponId>
```

```xml
      <DependentUponIdFailure>false</DependentUponIdFailure>
    </ActionDataHeader>
    <ActionData>
      <Name>Rule Modification Action</Name>
      <Description>Enable the related PEP Tracking rule.</Description>
      <RuleMod>
        <TargetRuleGuid>a996afcd-7471-4e3e-99dd-794c211f46ee</TargetRuleGuid>
        <PropertyMods>
          <PropertyMod>
            <PropertyName>Enabled</PropertyName>
            <PropertyValue>true</PropertyValue>
          </PropertyMod>
          <PropertyMod>
            <PropertyName>StartDate</PropertyName>
            <PropertyValue>now</PropertyValue>
          </PropertyMod>
          <PropertyMod>
            <PropertyName>EndDate</PropertyName>
            <PropertyValue>+30</PropertyValue>
          </PropertyMod>
        </PropertyMods>
      </RuleMod>
    </ActionData>
  </ActionDataContainer>
  <ActionDataContainer xsi:type="SignalActionDataContainer" signalType="ActionPassed">
    <Version>2</Version>
    <ActionDataHeader>
      <Classification>SignalAction</Classification>
      <Version>2</Version>
      <Id>785c99bb-4bf6-47f8-b98a-233bb352d09c</Id>
      <IsExecutionVoter>true</IsExecutionVoter>
      <DependentUponId>cd7212a4-5fbd-417a-a740-ca46381f8fec</DependentUponId>
      <DependentUponIdFailure>false</DependentUponIdFailure>
    </ActionDataHeader>
  </ActionDataContainer>
  <ActionDataContainer xsi:type="SignalActionDataContainer" signalType="ActionFailed">
    <Version>2</Version>
    <ActionDataHeader>
      <Classification>SignalAction</Classification>
      <Version>2</Version>
      <Id>104f53e6-2a12-40d7-b990-c31801972b31</Id>
      <IsExecutionVoter>false</IsExecutionVoter>
      <DependentUponId>cd7212a4-5fbd-417a-a740-ca46381f8fec</DependentUponId>
      <DependentUponIdFailure>true</DependentUponIdFailure>
    </ActionDataHeader>
  </ActionDataContainer>
</Actions>
```

```
    <MetaDataFields />
<Signature>dFXz2cKj3lm9Bu1F5q+YNBQyuS91KOHIozMqHoIifr6NoW7WEO9KLA==</Signature>
    <StartDate xsi:nil="true" />
    <EndDate xsi:nil="true" />
   </Rule>
  </Rules>
  <Version>2</Version>
 </RuleStore>
</ProductAdvisorRules>
```

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
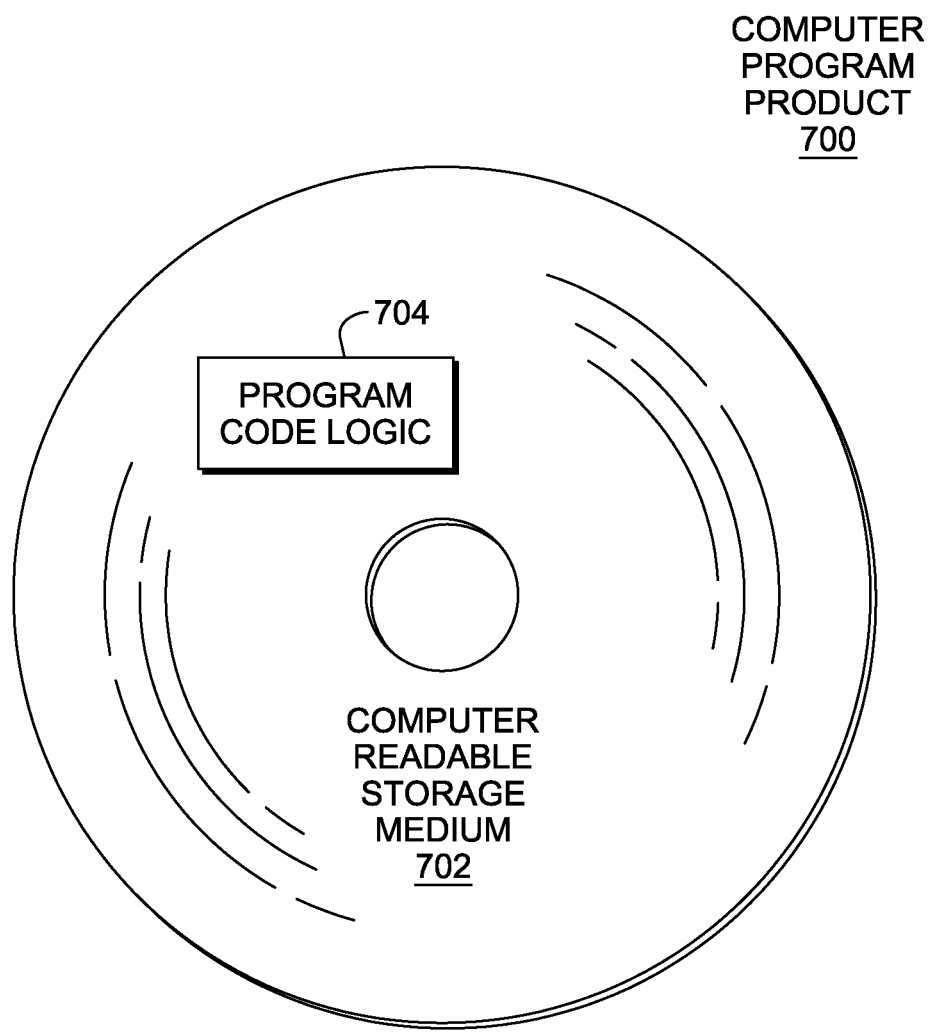
FIG. 7 depicts one embodiment of a computer program product to incorporate one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for selectively triggering execution of services in a computing environment, the method comprising:
    providing an advisor program, the advisor program to execute on a processor and to perform a method comprising:
        monitoring user interaction with an application during execution of the application in the computing environment;
        based on the monitoring, detecting that the user has interacted with an application attribute associated with the executing application;
        determining, based on checking one or more rules associated with the advisor program, each rule of the one or more rules comprising at least one logical expression, that the application attribute is specified as at least one element of a logical expression of a rule of the one or more rules, the one or more rules being defined separate from the application using one or more identifiers employed, at least in part, by the application in identifying application attributes thereof, and the logical expression being for evaluation to determine whether to trigger execution of one or more services specified by the rule;
        based on the detecting and on the determining that the application attribute with which the user interacted is specified as an element of a logical expression of the rule, triggering obtaining further data about the application attribute, the obtaining further data comprising monitoring further user behavior with respect to the application attribute during execution of the executing application, and wherein the obtaining further data comprises monitoring the application attribute over a period of time and building an application state comprising data about the application attribute over the period of time;
        using the obtained further data in evaluating the logical expression of the rule and determining, based on the evaluating, whether to trigger execution of the one or more services specified by the rule, wherein the evaluating the logical expression evaluates the logical expression based, at least in part, on the built application state; and
        triggering execution of the one or more services specified by the rule, based on determining to trigger execution of the one or more services specified by the rule.

2. The method of claim 1, wherein the application comprises compiled program code, and wherein the advisor program comprises at least one of a set of libraries or executable code separate from the compiled program code of the application.

3. The method of claim 1, wherein the logical expression further a system variable of a computer system on which the application is installed or application user data stored by the application, wherein the logical expression is evaluated based on the system variable or the application user data specified in the logical expression to determine whether to trigger execution of the one or more services.

4. The method of claim 1, further comprising:
    identifying an additional element of the logical expression of the rule, the additional element being pertinent to the evaluation of the logical expression to determine whether to trigger execution of the one or more services specified by the rule; and
    executing another service specified by the rule, the another service being different than the one or more services, to obtain a result to be used for the additional element of the logical expression of the rule, for performing the evaluation of the logical expression to determine whether to trigger execution of the one or more services specified by the rule.

5. The method of claim 1, wherein the logical expression of the rule defines at least one time constraint over the period of time on at least one expression of the logical expression, and wherein the evaluating the logical expression evaluates the logical expression based, at least in part, on the time constraint on the at least one expression.

6. The method of claim 1, wherein the one or more services comprise at least one of a group comprising a feedback message to a developer of the application, or a data fix-up service in which application configuration data or application user data is modified.

7. The method of claim 1, wherein the monitoring the further user behavior with respect to the application attribute comprises building a user behavior state based, at least partially, on the monitored further user behavior, and wherein the evaluating the logical expression is based on the built user behavior state.

8. The method of claim 7, wherein the user interaction with the application comprises user interaction with a user interface element of the application, wherein the application attribute comprises a sub-element of the user interface element of the application, and wherein the obtaining further data comprises monitoring further user behavior with respect to the sub-element of the user interface element.

9. The method of claim 7, wherein the application attribute comprises a user interface element of the application and wherein the one or more services comprise a service message to the user regarding the user's behavior with respect to the user interface element.

10. The method of claim 7, wherein user behavior with respect to only one or more application attributes specified as part of the at least one logical expression of the rule is monitored.

11. The method of claim 7, wherein the user behavior with respect to the application attribute comprises non-interaction by the user with the application attribute.

12. The method of claim 7, wherein the monitored further user behavior with respect to the application attribute occurs in a current application session, wherein the user behavior state is further built based on monitored user behavior that occurred in at least one prior application session, and wherein the logical expression is evaluated based, in part, on the monitored user behavior that occurred in the at least one prior application session and, in part, on the monitored user behavior that occurred in the current application session.

13. A computer system for selectively triggering execution of services in a computing environment, the computer system comprising:
 a memory; and
 a processor in communication with the memory, wherein the computer system is configured to perform a method comprising:
  providing an advisor program, the advisor program performing a method comprising:
   monitoring user interaction with an application during execution of the application in the computing environment;
   based on the monitoring, detecting that the user has interacted with an application attribute associated with the executing application;
   determining, based on checking one or more rules associated with the advisor program, each rule of the one or more rules comprising at least one logical expression, that the application attribute is specified as at least one element of a logical expression of a rule of the one or more rules, the one or more rules being defined separate from the application using one or more identifiers employed, at least in part, by the application in identifying application attributes thereof, and the logical expression being for evaluation to determine whether to trigger execution of one or more services specified by the rule;
   based on the detecting and on the determining that the application attribute with which the user interacted is specified as an element of a logical expression of the rule, triggering obtaining further data about the application attribute, the obtaining further data comprising monitoring further user behavior with respect to the application attribute during execution of the executing application, and wherein the obtaining further data comprises monitoring the application attribute over a period of time and building an application state comprising data about the application attribute over the period of time;
   using the obtained further data in evaluating the logical expression of the rule and determining, based on the evaluating, whether to trigger execution of the one or more services specified by the rule, wherein the evaluating the logical expression evaluates the logical expression based, at least in part, on the built application state; and
   triggering execution of the one or more services specified by the rule, based on determining to trigger execution of the one or more services specified by the rule.

14. The computer system of claim 13, wherein the logical expression further specifies a system variable of a computer system on which the application is installed, or application user data stored by the application, wherein the logical expression is evaluated based on the system variable or the application user data specified in the logical expression to determine whether to trigger execution of the one or more services.

15. The computer system of claim 13, wherein the monitoring the further user behavior with respect to the application attribute comprises building a user behavior state based, at least partially, on the monitored further user behavior, and wherein the evaluating the logical expression is based on the built user behavior state.

16. The computer system of claim 15, wherein the user interaction with the application comprises user interaction with a user interface element of the application, wherein the application attribute comprises a sub-element of the user interface element of the application, and wherein the obtaining further data comprises monitoring further user behavior with respect to the sub-element of the user interface element.

17. A computer program product for triggering of execution of services in a computing environment, the computer program product comprising:
 a non-transitory storage medium readable by a processor and storing instructions for execution by the processor to perform a method comprising:
  providing an advisor program, the advisor program performing a method comprising:
   monitoring user interaction with an application during execution of the application in the computing environment;
   based on the monitoring, detecting that the user has interacted with an application attribute associated with the executing application;
   determining, based on checking one or more rules associated with the advisor program, each rule of the one or more rules comprising at least one logical expression, that the application attribute is specified as at least one element of a logical expression of a rule of the one or more rules, the one or more rules being defined separate from the application using one or more identifiers employed, at least in part, by the application in identifying application attributes thereof, and the logical expression being for evaluation to determine whether to trigger execution of one or more services specified by the rule;
   based on the detecting and on the determining that the application attribute with which the user interacted is specified as an element of a logical expression of the rule, triggering obtaining further data about the application attribute, the obtaining further data comprising monitoring further user behavior with respect to the application attribute during execution of the executing application, and wherein the obtaining further data comprises monitoring the application attribute over a period of time and building an application state comprising data about the application attribute over the period of time;
   using the obtained further data in evaluating the logical expression of the rule and determining, based on the evaluating, whether to trigger execution of the one or more services specified by the rule, wherein the evaluating the logical expression evaluates the logical expression based, at least in part, on the built application state; and
   triggering execution of the one or more services specified by the rule, based on determining to trigger execution of the one or more services specified by the rule.

18. The computer program product of claim 17, wherein the logical expression further specifies a system variable of a computer system on which the application is installed or application user data stored by the application, wherein the logical expression is evaluated based on the system variable or the application user data specified in the logical expression to determine whether to trigger execution of the one or more services.

19. The computer program product of claim 17, wherein the monitoring the further user behavior with respect to the application attribute comprises building a user behavior state based, at least partially, on the monitored further user behavior, and wherein the evaluating the logical expression is based on the built user behavior state.

20. The method of claim 1, wherein at least one rule of the one or more rules are updated, or at least one new rule is created and associated with the advisor program, on-demand by a developer of the advisor program based, at least in part, on feedback reporting by a service of the one or more services triggered for execution, wherein an existing rule of the one or more rules is modified or deleted, or an additional rule is specified and provided to the advisor program.

* * * * *